(12) United States Patent
Clark

(10) Patent No.: US 12,737,711 B2
(45) Date of Patent: Sep. 15, 2026

(54) METHODOLOGY FOR MANAGING PERSONNEL ENGAGEMENT

(71) Applicant: Garrett Clark, Guyton, GA (US)

(72) Inventor: Garrett Clark, Guyton, GA (US)

( * ) Notice: Subject to any disclaimer, the term of this patent is extended or adjusted under 35 U.S.C. 154(b) by 5 days.

(21) Appl. No.: 18/673,032

(22) Filed: May 23, 2024

(65) Prior Publication Data

US 2024/0311739 A1 Sep. 19, 2024

(51) Int. Cl.
*G06Q 10/0639* (2023.01)

(52) U.S. Cl.
CPC .............................. *G06Q 10/06398* (2013.01)

(58) Field of Classification Search
CPC ............. G06Q 10/063; G06Q 10/0639; G06Q 10/06393; G06Q 10/06395; G06Q 10/06398
See application file for complete search history.

(56) References Cited

U.S. PATENT DOCUMENTS

| | | | | |
|---|---|---|---|---|
| 10,445,668 | B2 | 10/2019 | Oehrle et al. | |
| 2009/0287642 | A1* | 11/2009 | Poteet | G06Q 30/02 |
| 2018/0225602 | A1* | 8/2018 | Joi | G06T 11/206 |
| 2020/0234208 | A1* | 7/2020 | Childress | H04L 63/102 |
| 2020/0387848 | A1* | 12/2020 | Kasa | G06Q 10/105 |
| 2021/0019357 | A1* | 1/2021 | Bennett | G10L 15/26 |
| 2024/0046175 | A1* | 2/2024 | Ghosh | G06Q 10/105 |

OTHER PUBLICATIONS

Bock, Anais, "Where does the Purpose Diagram come from?", Let's work magic blog, downloaded from https://www.letsworkmagic.com/blog/whats-the-origin-of-the-purpose-diagram on Mar. 1, 2024.
Symonds, Cat, "How to Use Predictive Analytics Software for HR", Factorial HR, downloaded from https://factorialhr.com/blog/predictive-analytics-software-for-hr/ on Apr. 13, 2024.
Bock, Anais, "Where does the Purpose Diagram come from?", Let's Work Magic blog, Jul. 12, 2017.
Clark, Garrett, LinkedIn posts from various dates, Linkedln.com, downloaded from https://www.linkedin.com/in/inspiredsolutions/recent-activity/all/ on Jun. 22, 2024.

(Continued)

*Primary Examiner* — William S Brockington, III
(74) *Attorney, Agent, or Firm* — Richard A Baker, Jr.

(57) ABSTRACT

A device and software method for tracking and improving employee satisfaction and engagement is described. By improving employee satisfaction and engagement, employees are inspired to contribute to the growth of the entire organization. The device and method prompt for answers to questions and observations on each employee and these answers are analyzed to determine the employee's Maslow Hierarchy score, Flow Map level, Hero's Journey stage, and Purpose Venn Diagram score. These scores for each employee are aggregated for teams and for an entire organization. The answers and scores may be stored over time to provide a view of the improvements in employee satisfaction and engagement over time. Furthermore, the employee scores may be used to generate a specific action plan to improve employee satisfaction and engagement.

20 Claims, 20 Drawing Sheets

(56) References Cited

OTHER PUBLICATIONS

Brophy, Steve, "Embrace the struggle and get into FLOW", Transformative Learning blog, downloaded from https://stevebrophy.wordpress.com/2017/08/24/embrace-the-struggle-and-get-into-flow/ on May 22, 2024.
"Hero's Journey PowerPoint and Google Slides Template", SketchBubble, webpage downloaded from https://www.sketchbubble.com/en/presentation-hero-journey.html on May 22, 2024.
Ma, Conrad, "What doesn't kill one, really doesn't make one stronger", Medium, webpage downloaded from https://medium.com/@maconrad49/what-doesnt-kill-one-really-doesn-t-make-one-stronger-64035fab25f5 on May 22, 2024.
"Antifragility", Bilit.com, webpage downloaded from https://www.bitil.com/best-practices/itil/itil-4/itil-4-hvit/antifragility on May 22, 2024.
"Ladder of Divine Ascent icon", Orthodox Wiki, webpage downloaded from https://orthodoxwiki.org/Ladder_of_Divine_Ascent_icon on May 22, 2024.
Duff, Sacha, et al., "A Systems Approach to Diagnosing and Measuring Teamwork in Complex Sociotechnical Organizations", Proceedings of the Human Factors and Ergonomics Society 58th Annual Meeting—2014.

* cited by examiner

| WEEK OF | 12/2/2020 | 12/22/2020 | 12/30/2020 | 1/6/2021 | 1/13/2021 | 1/20/2021 | 1/27/2021 | 2/6/2021 | 2/13/2021 | 2/20/2021 | 2/27/2021 | 3/6/2021 | 3/13/2021 | 3/20/2021 | 3/25/2021 | 4/1/2021 | 4/8/2021 | 4/15/2021 | 4/22/2021 |
|---|---|---|---|---|---|---|---|---|---|---|---|---|---|---|---|---|---|---|---|
| 1: SURVIVAL | 0 | 0 | 0 | 0 | 0 | 0 | 1 | 0 | 0 | 0 | 0 | 0 | 0 | 0 | 0 | 0 | 0 | 0 | 0 |
| 2: SECURITY | 2 | 4 | 5 | 3 | 0 | 1 | 0 | 1 | 0 | 0 | 0 | 0 | 1 | 1 | 1 | 0 | 0 | 0 | 0 |
| 3: BELONGING | 2 | 2 | 2 | 4 | 5 | 3 | 1 | 3 | 3 | 3 | 3 | 3 | 2 | 3 | 3 | 4 | 3 | 2 | 4 |
| 4: IMPORTANCE | 4 | 5 | 5 | 4 | 6 | 8 | 10 | 6 | 6 | 6 | 4 | 4 | 5 | 3 | 3 | 3 | 3 | 4 | 3 |
| 5: SELF ACTUALIZATION | 6 | 5 | 4 | 5 | 5 | 4 | 4 | 5 | 6 | 6 | 8 | 8 | 7 | 8 | 8 | 9 | 8 | 8 | 8 |
| 6: TRANSCENDENCE | 2 | 2 | 3 | 1 | 1 | 2 | 2 | 1 | 0 | 1 | 1 | 1 | 2 | 1 | 2 | 2 | 1 | 1 | 1 |
| TEAM MEMBERS | 14 | 16 | 19 | 17 | 17 | 18 | 18 | 15 | 15 | 16 | 16 | 16 | 17 | 16 | 15 | 18 | 15 | 15 | 16 |
| % OF TEAM 5 OR ABOVE | 43% | 31% | 21% | 29% | 29% | 22% | 33% | 40% | 38% | 50% | 50% | 50% | 53% | 50% | 53% | 50% | 53% | 53% | 50% |

| WEEK OF | 1/22/22 | 1/26/2022 | 1/30/2022 | 2/6/2022 | 2/16/2022 | 2/23/2022 | 3/2/2022 | 3/9/2022 | 3/16/2022 |
|---|---|---|---|---|---|---|---|---|---|
| 1.APATHY (20) | 0 | 0 | 0 | 0 | 0 | 0 | 0 | 0 | 0 |
| 2.WORRY (40) | 0 | 0 | 1 | 0 | 0 | 0 | 0 | 0 | 0 |
| 3.ANXIETY(30) | 0 | 0 | 0 | 0 | 0 | 0 | 0 | 0 | 0 |
| 4.BOREDOM (40) | 0 | 0 | 0 | 0 | 0 | 0 | 0 | 1 | 1 |
| 5.RELAXATION (60) | 1 | 1 | 1 | 1 | 3 | 3 | 3 | 2 | 2 |
| 6.AROUSAL (90) | 3 | 3 | 2 | 4 | 4 | 5 | 3 | 3 | 5 |
| 7.CONTROL(90) | 10 | 8 | 7 | 5 | 3 | 4 | 5 | 6 | 5 |
| 8.FLOW(150) | 1 | 3 | 4 | 4 | 4 | 3 | 4 | 3 | 3 |
| TEAM MEMBERS | 15 | 15 | 14 | 14 | 14 | 15 | 15 | 15 | 16 |
| % OF TEAM IN FLOW | 6% | 20% | 28% | 28% | 28% | 20% | 26% | 20% | 18% |

| | 1/22/23 | 1/31/2023 | 2/12/23 | 2/19/2023 | 2/26/23 | 7/3 | 7/18 | 7/24 | 8/16 | 8/21 | 9/25 | 10/3 | 10/9 | 10/16 | 10/23 | 10/30 | 11/14 |
|---|---|---|---|---|---|---|---|---|---|---|---|---|---|---|---|---|---|
| IKIGAI | **2** | **2** | **0** | **2** | **1** | 6 | 5 | 5 | 7 | 7 | 4 | 4 | 4 | 4 | 4 | 4 | 7 |
| LOVE | 0 | 0 | 0 | 1 | 1 | 0 | 0 | 0 | 0 | 0 | 0 | 0 | 0 | 0 | 0 | 0 | 0 |
| OVERLAP OF PASSION & MISSION | 0 | 0 | 0 | 0 | 0 | 0 | 0 | 0 | 0 | 0 | 0 | 0 | 1 | 1 | 1 | 1 | 2 |
| PASSION | 4 | 4 | 6 | 6 | 3 | 0 | 2 | 2 | 1 | 1 | 0 | 0 | 0 | 0 | 0 | 0 | 0 |
| GOOD AT | 2 | 2 | 0 | 0 | 1 | 0 | 0 | 0 | 0 | 0 | 0 | 0 | 0 | 0 | 0 | 0 | 0 |
| OVERLAP OF PASSION & PROFESSION | 0 | 0 | 0 | 0 | 0 | 0 | 0 | 0 | 0 | 0 | 0 | 1 | 2 | 4 | 4 | 4 | 2 |
| PROFESSION | 4 | 4 | 4 | 4 | 4 | 2 | 2 | 2 | 1 | 1 | 0 | 0 | 0 | 0 | 0 | 0 | 0 |
| PAID FOR | 1 | 1 | 2 | 2 | 3 | 3 | 0 | 1 | 1 | 1 | 1 | 0 | 1 | 2 | 2 | 2 | 0 |
| OVERLAP OF VOCATION & PROFESSION | 0 | 0 | 0 | 0 | 0 | 0 | 0 | 0 | 0 | 0 | 4 | 3 | 4 | 3 | 3 | 3 | 4 |
| VOCATION | 2 | 1 | 1 | 1 | 2 | 2 | 3 | 3 | 3 | 3 | 2 | 0 | 0 | 1 | 1 | 1 | 0 |
| NEEDS | 0 | 0 | 0 | 0 | 0 | 0 | 0 | 0 | 0 | 0 | 0 | 0 | 0 | 0 | 0 | 0 | 0 |
| MISSION | 4 | 4 | 4 | 0 | 3 | 3 | 5 | 5 | 2 | 2 | 0 | 0 | 0 | 0 | 0 | 0 | 0 |
| OVERLAP OF MISSION & PROFESSION | 0 | 0 | 0 | 0 | 0 | 0 | 0 | 0 | 0 | 0 | 3 | 6 | 7 | 4 | 5 | 5 | 4 |
| TEAM MEMBERS | 19 | 18 | 17 | 16 | 18 | 16 | 17 | 18 | 15 | 15 | 14 | 14 | 19 | 19 | 20 | 20 | 19 |
| % OF TEAM IN MISSION | 31% | 33% | 23% | 12% | 22% | 56% | 58% | 55% | 60% | 60% | 28% | 28% | 21% | 21% | 20% | 20% | 36% |

FIG. 10

| WEEK OF | 1/22/22 | 1/26/2022 | 1/30/2022 | 2/6/2022 | 2/16/2022 | 2/23/2022 | 3/2/2022 | 3/9/2022 | 3/16/2022 | 3/23/2022 | 3/30/2022 | 4/6/2022 | 4/13 | 4/18 |
|---|---|---|---|---|---|---|---|---|---|---|---|---|---|---|
| NEED OR DESIRE | 2 | 1 | 0 | 0 | 2 | 2 | 1 | 2 | 1 | 2 | 2 | 3 | 3 | 1 |
| UNFAMILIAR SITUATION | 1 | 2 | 1 | 1 | 0 | 0 | 3 | 1 | 1 | 2 | 3 | 2 | 4 | 2 |
| ADAPTION | 3 | 1 | 1 | 1 | 1 | 1 | 0 | 2 | 2 | 2 | 1 | 3 | 2 | 2 |
| GET WHAT THEY WANT | 2 | 3 | 1 | 1 | 1 | 1 | 1 | 1 | 1 | 2 | 2 | 1 | 2 | 3 |
| PAY THE PRICE | 3 | 2 | 3 | 3 | 3 | 3 | 3 | 2 | 2 | 2 | 1 | 2 | 1 | 2 |
| RETURN TO COMFORT | 2 | 3 | 2 | 2 | 3 | 3 | 3 | 3 | 3 | 3 | 2 | 3 | 2 | 1 |
| HAVING CHANGED | 1 | 2 | 3 | 3 | 3 | 3 | 2 | 2 | 2 | 0 | 2 | 1 | 1 | 3 |
| COMFORT ZONE | 1 | 1 | 4 | 4 | 2 | 2 | 2 | 3 | 4 | 3 | 3 | 1 | 1 | 1 |
| TEAM MEMBERS | 15 | 15 | 15 | 15 | 15 | 15 | 15 | 16 | 16 | 16 | 16 | 16 | 16 | 15 |
| % OF TEAM IN COMFORT ZONE | 6% | 6% | 26% | 26% | 13% | 13% | 13% | 18% | 25% | 18% | 18% | 6% | 6% | 6% |

METHODOLOGY FOR MANAGING PERSONNEL ENGAGEMENT

CROSS-REFERENCE

This is a priority patent application.

FIELD OF THE INVENTIONS

The present inventions relate to workforce management, and more particularly, to the management of personnel engagement.

BACKGROUND OF THE INVENTIONS

According to the Harvard Business School, "The most important asset at your company isn't something you can put your hands on. It isn't equipment or the physical plant, and it isn't data, technology, or intellectual property. The most valuable part of your company is the people—the human capital." Yet for all of the importance of human capital in the operation of a business, there is insufficient focus on optimizing the productivity of a workforce. In the 1940s, efficiency experts used stopwatches to measure how fast a worker could create a widget, but these efficiency experts focused on the mechanisms of the operation, almost viewing the worker as a robotic machine. Little work was done on how to practically motivate the worker to excel in his own job. Mihaly Csikszentmihalui, Abraham Maslow, and others described frameworks for explaining human motivation, but there is a strong, unfelt need for tools to analyze an employee and provide tools for motivating the employee to excel in the job.

There are many software packages for the administration of human resources and the tracking of employees. Other software programs track the efficiency of an employee and how productively the employee works. However, few software packages analyze each employee and the factors that affect the motivation of the employee. Japanese patent JP6553935 teaches a "Human resources risk management system" that evaluates the stress of employees and their likelihood of departing an organization. However, this Japanese patent looks at a narrow view of employee stress and does not look at moving an employee to excel in their job. Furthermore, the Japanese patent uses inefficient data structures for storing employee data. The present inventions provide improved data collection and data storage structures, as well as improving the analysis of employee data to provide a more comprehensive view of employee behavior.

SUMMARY OF THE INVENTIONS

In some aspects, the techniques described herein relate to a computing device with a memory and a display device, the memory including machine-readable non-transitory instructions to instruct the computing device to: prompt a user through the display device for periodic data on a plurality of employees; accept the periodic data on the plurality of the employees, where the periodic data includes answers to the prompts; store the periodic data in an employee data record, the employee data record storing an employee identification, a date, and the periodic data; process the employee data record to determine an employee Maslow Hierarchy score, an employee Purpose Venn Diagram score, an employee Flow Map rating, and an employee Hero's Journey stage; aggregate the employee data records into a team Maslow Hierarchy score, a team Purpose Venn Diagram score, a team Flow Map rating, and a team Hero's Journey stage; aggregate the employee data records into a company Maslow Hierarchy score, a company Purpose Venn Diagram score, a company Flow Map rating, and a company Hero's Journey stage; display on the display device a representation of an organizational chart of the company, including the company Maslow Hierarchy score, the company Purpose Venn Diagram score, the company Flow Map rating, and the company Hero's Journey stage; accept input from the user on the display device to display the employee Maslow Hierarchy score, the employee Purpose Venn Diagram score, the employee Flow Map rating, and the employee Hero's Journey stage; accept input from the user on the display device to show details of the employee Maslow Hierarchy score and trends of the employee Maslow Hierarchy score; and present, on the display device, actions for the employee to improve the employee Maslow Hierarchy score.

In some aspects, the techniques described herein relate to a computing device with the memory and the display device where the display device operates a web browser.

In some aspects, the techniques described herein relate to a computing device with the memory and the display device where the answers to prompts are free-form text.

In some aspects, the techniques described herein relate to a computing device with the memory and the display device where the determination of the employee Maslow Hierarchy score includes instructions to parse the free-form text.

In some aspects, the techniques described herein relate to a computing device with the memory and the display device where the determination of the employee Maslow Hierarchy score includes instructions to lemmatization of the free-form text into a word table.

In some aspects, the techniques described herein relate to a computing device with the memory and the display device where the determination of the employee Maslow Hierarchy score includes instructions to look up a weight of each word in the word table and to sum the weights.

In some aspects, the techniques described herein relate to a computing device with the memory and the display device where the determination of the employee Maslow Hierarchy score includes instructions to compare the sum of the weights with a predetermined level for a specific Maslow Hierarchy score.

In some aspects, the techniques described herein relate to a computing device with the memory and the display device where the determination of the employee Maslow Hierarchy score includes instructions to assign the employee Maslow Hierarchy score to a highest Maslow Hierarchy level with at least half of the answers being affirmative for a specific Maslow Hierarchy level.

In some aspects, the techniques described herein relate to a computing device with the memory and the display device where the determination of the employee Maslow Hierarchy score includes instructions to look up a weight of an answer in an answer table and to sum the weights.

In some aspects, the techniques described herein relate to a computing device with the memory and the display device where the determination of the employee Maslow Hierarchy score includes instructions to compare the sum of the weights with a predetermined level for a specific Maslow Hierarchy score.

In some aspects, the techniques described herein relate to a method including: prompting a user through a display device for periodic data on a plurality of employees; accepting the periodic data on the plurality of the employees, where the periodic data includes answers to the prompts; storing the periodic data in an employee data record, the employee data record storing an employee identification, a date, and the periodic data; processing the employee data record to determine an employee Maslow Hierarchy score, an employee Purpose Venn Diagram score, an employee Flow Map rating, and an employee Hero's Journey stage; aggregating the employee data records into a team Maslow Hierarchy score, a team Purpose Venn Diagram score, a team Flow Map rating, and a team Hero's Journey stage; aggregating the employee data records into a company Maslow Hierarchy score, a company Purpose Venn Diagram score, a company Flow Map rating, and a company Hero's Journey stage; displaying on the display device a representation of an organizational chart of the company, including the company Maslow Hierarchy score, the company Purpose Venn Diagram score, the company Flow Map rating, and the company Hero's Journey stage; accepting input from the user on the display device to display the employee Maslow Hierarchy score, the employee Purpose Venn Diagram score, the employee Flow Map rating, and the employee Hero's Journey stage; accepting input from the user on the display device to show details of the employee Purpose Venn Diagram score and trends of the employee Purpose Venn Diagram score; and presenting, on the display device, actions for the employee to improve the employee Purpose Venn Diagram score.

In some aspects, the techniques described herein relate to a method where the display device operates a web browser.

In some aspects, the techniques described herein relate to a method where the answers to prompts are free-form text.

In some aspects, the techniques described herein relate to a method where the determination of the employee Purpose Venn Diagram score includes parsing the free-form text.

In some aspects, the techniques described herein relate to a method where the determination of the employee Purpose Venn Diagram score includes lemmatizing of the free-form text into a word table.

In some aspects, the techniques described herein relate to a method where the determination of the employee Purpose Venn Diagram score includes looking up a weight of each word in the word table and summing the weights.

In some aspects, the techniques described herein relate to a method where the determination of the employee Purpose Venn Diagram score includes comparing the sum of the weights with a predetermined level for a specific Purpose Venn Diagram score.

In some aspects, the techniques described herein relate to a method where the determination of the employee Purpose Venn Diagram score includes assigning the employee Purpose Venn Diagram score to a highest Purpose Venn Diagram level with at least half of the answers being affirmative for a specific Purpose Venn Diagram level.

In some aspects, the techniques described herein relate to a method where the determination of the employee Purpose Venn Diagram score includes looking up a weight of an answer in an answer table and summing the weights.

In some aspects, the techniques described herein relate to a method where the determination of the employee Purpose Venn Diagram score includes comparing the sum of the weights with a predetermined level for a specific Purpose Venn Diagram score.

DETAILED DESCRIPTION OF THE INVENTIONS

All illustrations of the drawings are for the purpose of describing selected versions of the present invention and are not intended to limit the scope of the present invention.

In this set of inventions, we focus on a workforce and the need to, the methods to, and the tools to motivate the workforce to excel in its performance. The workforce is viewed from a macro view, looking at the entire organization and the performance of the entire employee population. Next, the organization is broken down into subparts, with a study of the performance of that subpart. Finally, the individual employees are viewed to see the motivation of the individual, studying where the employee is at, and how to motivate the employee to excel. According to Maslow's hierarchy, there are six levels of engagement: safety, security, belonging, importance, self-actualization, and transcendence. The goal is to get employees to the transcendence level, with their safety, security, belonging, importance, and self-actualization needs fulfilled. This involves solving for a lack of purpose, a lack of drive, a lack of engagement, and overcoming feelings of being overwhelmed. This is the primary obstacle faced in the workforce that prevents working from excelling. This leads to an exponential rise in anxiety, suicide, and depression in the workforce. It is not possible for employees with their heads barely above water to excel at work.

Figure 1:
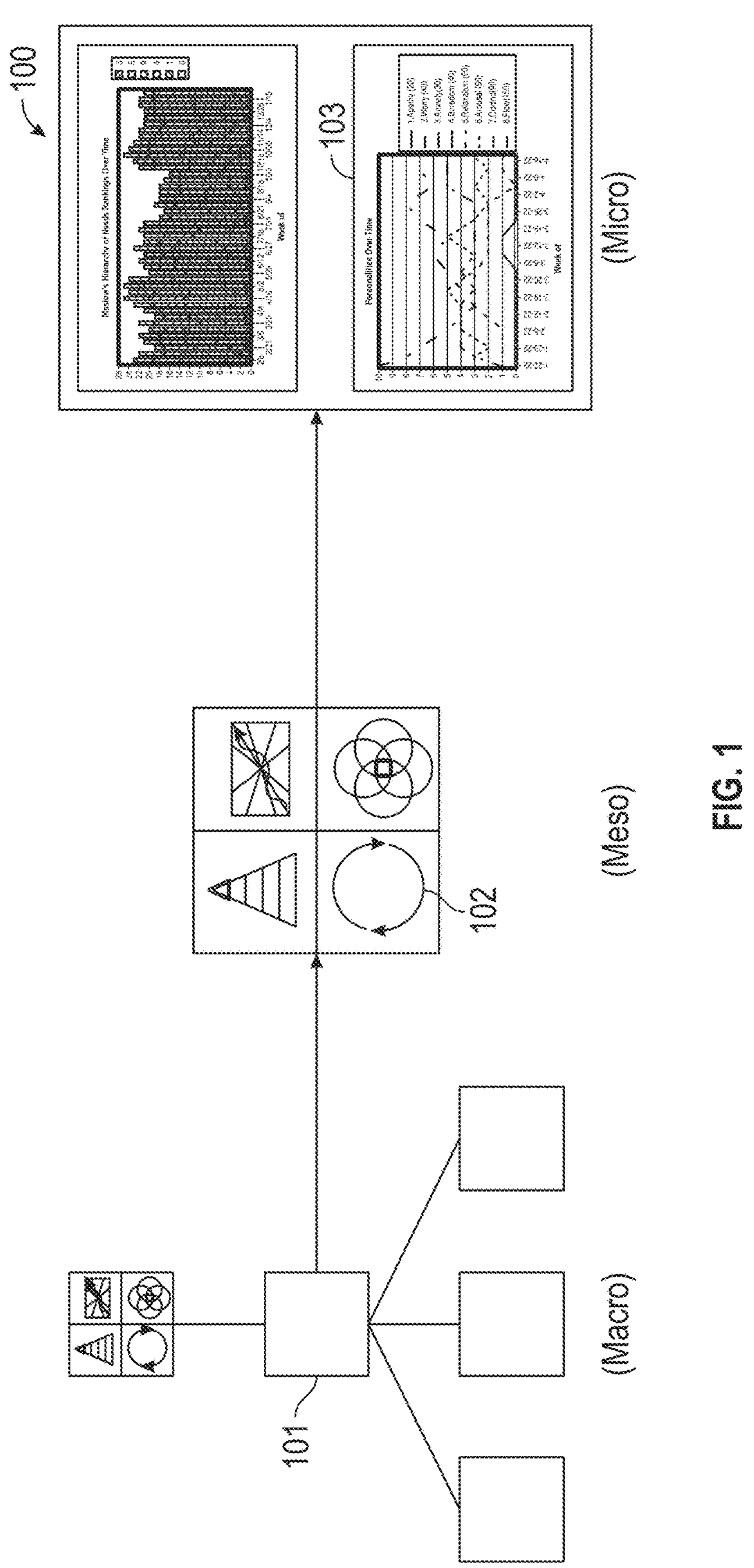
FIG. 1 is a view of the overall architecture of the user interface.

The tool described in FIG. 1 addresses this issue of employee motivation. FIG. 1 shows a functional view of the presentation of the data is seen. This may be the highest-level screen 100 for a user interface. The macro view 101 shows an organizational chart of an organization, with each node on the chart showing the meso view 102, in some embodiments. The meso view 102 comprises the four pillars of employee satisfaction and engagement: Maslow Hierarchy, Purpose Venn Diagram, Flow Map, and Hero's Journey. The micro view 103 shows the details of each pillar.

The four pillars of employee satisfaction and engagement are measured and improved for adaptation and growth as they relate to agreed-upon objectives and goals. Employee motivation and drive are most closely related to the Purpose Venn Diagram. Actual growth is measured by the Hero's journey map. Their psychological needs are measured by Maslow's hierarchy, and the Flow Map is leveling the employee up and growing the employee to reach their fullest potential. Employee satisfaction and engagement is a critical piece but this method goes beyond motivation, in that it yields growth in the material towards the highest human potential per Maslow and Mihaly Csikszentmihalyi.

In one embodiment, a moving screen pointer shows a screen position based on a mouse 1307 location over the macro view 101. As the mouse moves, it highlights an element in the organization chart under the mouse 1307 pointer and displays the meso view 102 for that element. Moving the mouse 1307 pointer to a different area of the screen could leave the last highlighted element highlighted, and the meso view 102 displayed. If the mouse 1307 pointer glides over one of the four squares of the meso view 102, then the details of that pillar of the meso view 102 may be displayed in the micro view 103. In the meso view 102 and the micro view 103, the employee or organizational unit name could be displayed. Each element of the macro view 101 hierarchy could include the employee or organizational unit name in the box.

In some embodiments, selecting an element of an element of the macro view 101 could cause the display of suggestions to improve the organizational element. In other embodiments, the improvement suggestions could be displayed for meso 102 or micro 103 elements.

Figure 2:
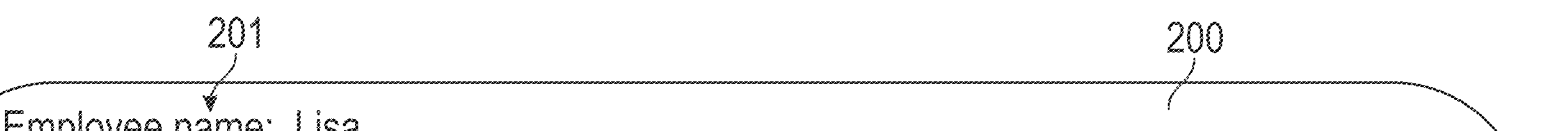
FIG. 2 is an example of a user input screen.

In one embodiment, the selection of an employee box could allow the user to enter data regarding the employee or organizational unit. One possible embodiment of a user input screen 200 is seen in FIG. 2. The organization's unit or employee's name 201 as well as the date 202 when the information is recorded are recorded and displayed on the user input screen 200. A number of questions 203 and observations are then presented for the user (typically a supervisor, manager, or human resources analyst) to enter. In some embodiments, the employee also provides self-analysis via questions and self-observations.

The questions could be as in Table 1 (these questions relate to a Maslow Hierarchy analysis):

TABLE 1

| | |
|---|---|
| Transcendence | looks for issues relating to the entire organization and beyond, seeks and solves industry issues<br>self-sacrifice for the entire organization, puts everyone's needs above their own |
| Self-Actualized | comes in early, stays late without being asked, Engagement is Level 5, Constantly Proactive, Constant Positive Attitude, Influences others to do their best, Comes up with projects and asks for things to do for the business, Inspires every Customer<br>taking charge of responsibilities (i.e. everything is in check; duties will be completed on time)<br>constantly helping others; firing up the team |
| Importance | proactive, Usually Positive Attitude, is a Positive Example to other artisans but doesn't lead them, willing to take on projects but doesn't ask for them/come up with them, Uplifts every customer, Level 4Engagement<br>artisan may be here after being out of work for a while<br>artisan is trying to "catch up" (i.e. keeping themselves busy; stressed)<br>artisan is delivering on mission |
| Belonging | new artisans begin here<br>outside circumstances may be affecting work performance<br>meets expectations (doesn't exceed them), comes in "early" for their shift, stays late if asked but doesn't offer, then the engagement level is at least 2-3<br>artisans who are not experiencing career development<br>artisan not fully bought in; going through the motions |
| Security | wants to switch shifts/get shifts covered constantly, only talks to one or two artisans, barely meets expectations engagement level is 1-2<br>artisan has more sick days than they should<br>artisan forming silo (only focused on the customer in front of them; not engaging with the team; lacking communication) |
| Survival | isolates themselves, doesn't stay to assist the team, doesn't come in if asked to if the store needs it, comes in right before their shift starts, always wants to leave right on time<br>artisan is only there to get paid<br>artisan not satisfied with the work they do; seeking other jobs |

Further questions could be as in Table 2 (these questions relate to a Purpose Venn Diagram analysis):

TABLE 2

| | |
|---|---|
| Ikigai | motivating force; artisan gives others a sense of purpose or reason for living<br>artisan creates to inspire<br>genuinely happy serving others |
| Love | artisan is not Good At their job yet but has potential (i.e. KPIs are red)<br>artisans need to build confidence in their skills/abilities |
| Passion (Love & Good At) | shows any strong, controlling, or overpowering emotion<br>a preferred sense of devotion<br>The artisan loves what they do and they are good at it<br>artisan is almost self-fulfilled but seeking other areas of fulfillment |
| Good At | artisan is confident in skills/abilities but not serving others or loving their role<br>artisans getting used to challenges & challenging themselves |
| Profession (Good At & Paid For) | an occupation in which a professed knowledge of some subject, field, or science is applied, especially one that involves prolonged training<br>the artisan has the drive but does not love what they do<br>artisan is Good At their job & paid for their efforts |
| Paid For | artisan not engaging/connecting with team/customers<br>artisan does not want to be there |
| Vocation (Paid For & Needs) | a strong conviction that it is one's duty or destiny to follow a particular way of life, course of action<br>getting paid for what the world needs<br>the artisan does not love their role but serves others |
| Needs | artisan has more sick days than they should<br>focused on serving others but not good at it doesn't love<br>pay needs not met |
| Mission | the enterprise or purpose for which a body is sent or established<br>shooting for being what the world needs (i.e. providing an unforgettable experience)<br>artisan is self-fulfilled & skills mastered |

Similar questions can be asked for the Hero's Journey and the Flow Map view of an employee. In another embodiment, the questions may be in the form requiring free-form text answers.

Figure 3:
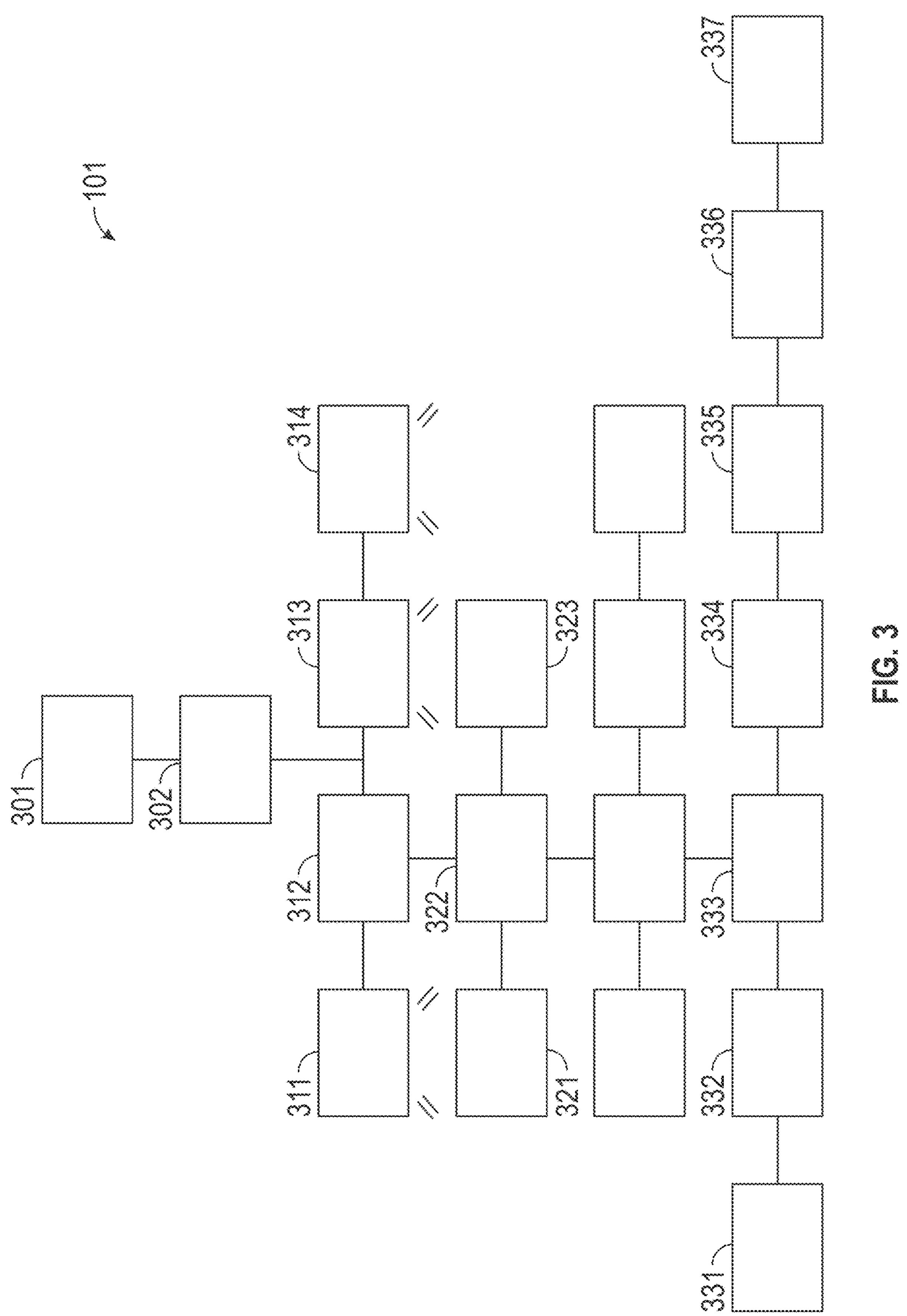
FIG. 3 is a window view of an organizational chart.

FIG. 3 shows a macro view 101 of the organization in the form of an organization chart. The performance of the entire organization can be seen by selecting or mousing over the top node 301. The next node down could show the motivation factors for the top manager 302 of the organization. The top manager's 302 direct reports 311,312,313,314 are seen in the next layer of the organizational chart. The next level 321,322,323 of managers in below the direct reports 311, 312,313,314. There could be additional layers based on the organizational structure. Finally, there is the layer of employees 331,332,333,334,335,336,337. In some embodiments, scrolling is used to navigate through the width and depth of an organization. In some embodiments, zooming may be used to view the organization from different levels of depth. Selecting a node provides information on that node of the organization on the employee residing at the node.

Figure 4:
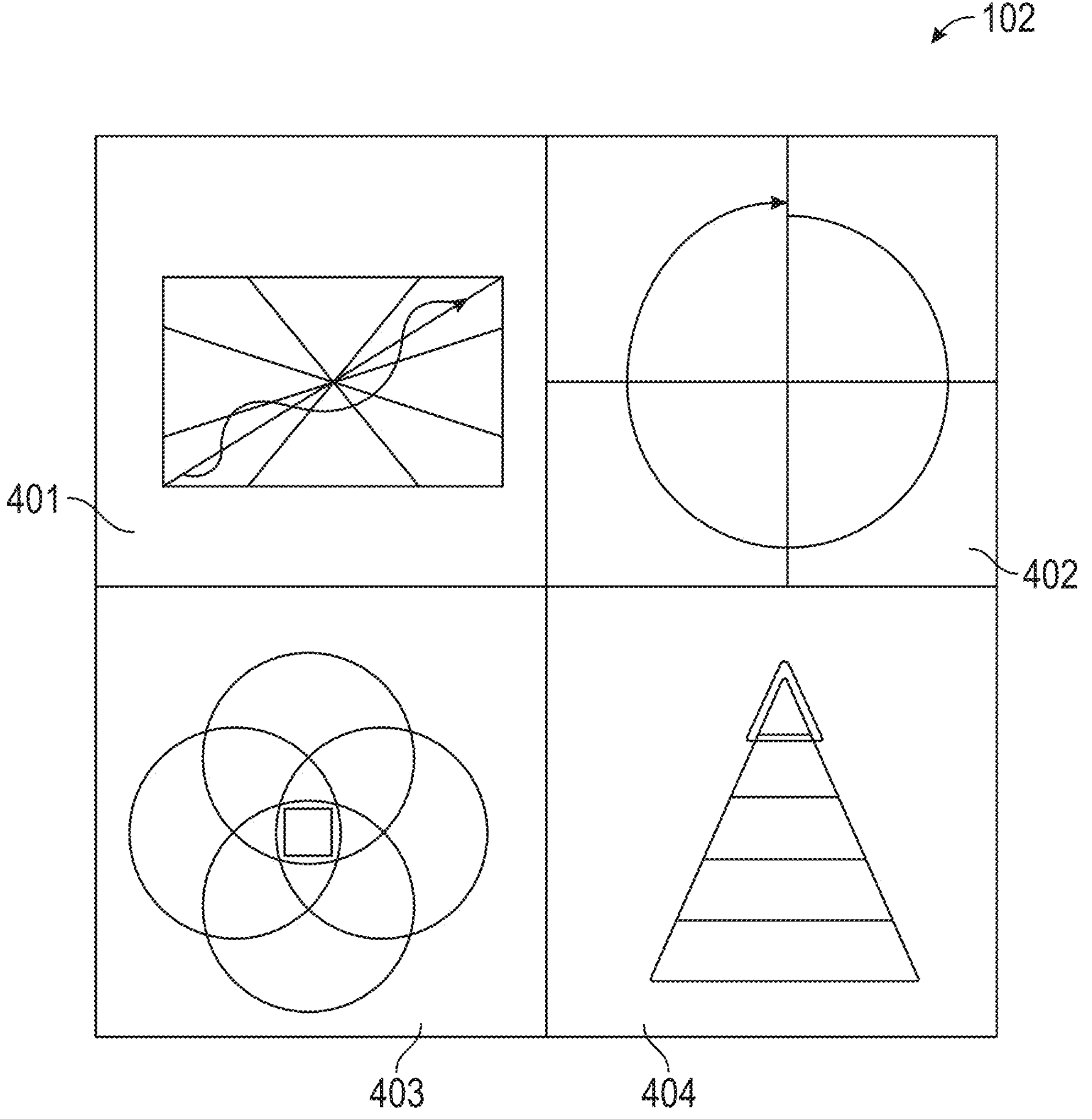
FIG. 4 is a status window of an element in the organizational chart.

The overall view of an employee's motivation in their work is the combination of four pillars of employee satisfaction and engagement as shown in the meso view 102 on a window of the web browser 1306*a*, 1306*b*, 1306*c*. As seen in FIG. 4, in the upper left corner of the window could be the Flow Map 401 diagram based on the work of Mihaly Csikszentmihalyi. This upper left section of the window may contain an image of the Flow Map 401 diagram. A section of the Flow Map 401 diagram may be highlighted to reflect the employee's status on the Flow Map 401 diagram. Further details of Flow Map 401 can be found in FIG. 7.

The upper right corner may be a Hero's Journey 402 diagram. This section of the window may contain an image of the Hero's Journey 402 diagram. A section of the Hero's Journey 402 diagram may be highlighted to reflect the employee's status on their journey in the organization/role on the Hero's Journey 402 diagram. Further details on Hero's Journey 402 can be found in FIG. 11.

The bottom left corner of the meso view 102 in the window could be a Purpose Venn 403 diagram. This section of the window may contain an image of the Purpose Venn 403 diagram. A section of the Purpose Venn 403 diagram may be highlighted to reflect the employee's status on the Purpose Venn 403 diagram. Further details on the Purpose Venn 403 diagram can be found in FIG. 9.

The bottom right corner of the window could be a Maslow Hierarchy 404 diagram. This section of the window may contain an image of the Maslow Hierarchy triangle, with one of the six levels highlighted to reflect this employee's rating on the Maslow Hierarchy scale. Further details of the Maslow Hierarchy 404 diagram can be found in FIG. 5.

In other embodiments, the placement of the four pillars could be changed without detracting from the present inventions.

The meso view 102 screen shows a particular employee or organizational unit's enthusiasm, needs, growth, health, purpose/drive, and may be updated dynamically based on a mouse over or mouse selection.

Figure 5:
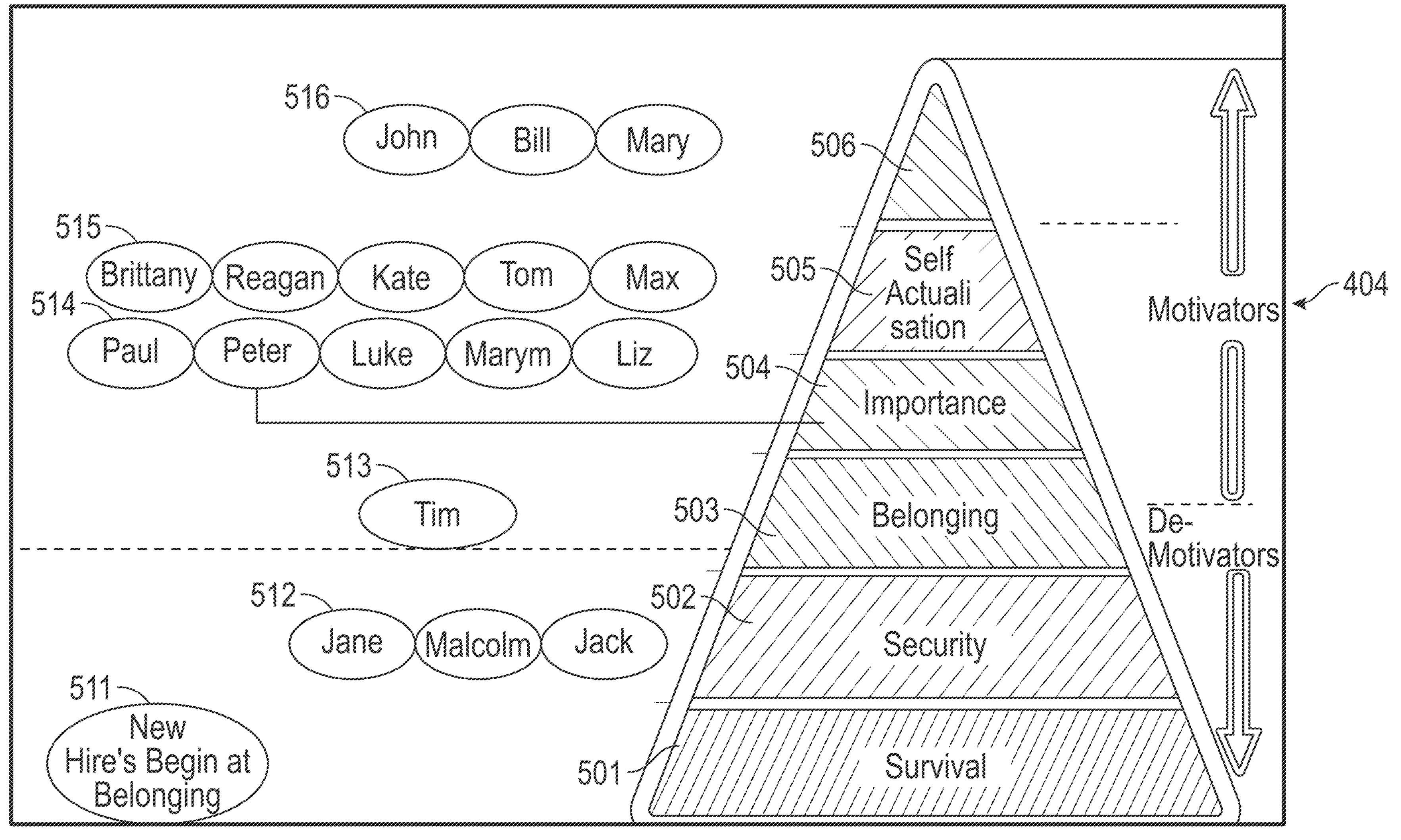
FIG. 5 is a detailed team view of employees at the various Maslow Hierarchy levels.

FIG. 5 shows a detailed view of a team or organizational unit including a Maslow Hierarchy 404 diagram along with the status of 19 employees.

According to the work of Abraham Maslow, his theory of human motivation has human behavior classified into five levels. Survival 501 and Physiological Needs, Security 502, and Safety, Belonging 503 and Social Needs, Importance 504 and Esteem Needs, and Self-Actualization 505. Some embodiments of the Maslow Hierarchy chart include a sixth level, transcendence, above Self-Actualization 505. The embodiments described herein are modified by adding the transcendence layer, but the five-layer Maslow model could be used.

The physiological needs include those that are vital to survival 501. Some examples of physiological needs include food, water, breathing, homeostasis, shelter, and clothing. In a workplace, this also includes a safe environment, and pay that meets their base needs.

At the second level of Maslow's hierarchy, the needs start to become a bit more complex. At this level, the needs for security 502 and safety become primary. People want control and order in their lives. Some of the basic security and safety needs include financial security, health and wellness, and safety against accidents and injury. Finding a job, obtaining health insurance and health care, contributing money to a savings account, and moving to a safer neighborhood are all examples of actions motivated by security and safety needs.

The social needs in Maslow's hierarchy include love, acceptance, and belonging 03. At this level, the need for emotional relationships drives human behavior. Some of the things that satisfy this need include friendships, romantic attachments, family relationships, social groups, community groups, and churches and religious organizations. In order to avoid loneliness, depression, and anxiety, it is important for people to feel loved and accepted by others. Personal relationships with friends, family, and lovers play an important role, as does involvement in groups—such as religious groups, sports teams, book clubs, and other group activities.

At the fourth level in Maslow's hierarchy is the need for importance 504, appreciation, and respect. Once the needs at the bottom three levels have been satisfied, the esteem needs begin to play a more prominent role in motivating behavior. At this level, it becomes increasingly important to gain the respect and appreciation of others. People have a need to accomplish things, and then have their efforts recognized. In addition to the need for feelings of accomplishment and prestige, esteem needs include such things as self-esteem and personal worth. People need to sense that they are valued by others and feel that they are making a contribution to the world. Participation in professional activities, academic accomplishments, athletic or team participation, and personal hobbies can all play a role in fulfilling the esteem needs. People who are able to satisfy esteem needs by achieving good self-esteem and the recognition of others tend to feel confident in their abilities. Conversely, those who lack self-esteem and the respect of others can develop feelings of inferiority.

The next level of Maslow's hierarchy is Self-actualization 505. Self-actualizing people are self-aware, concerned with personal growth, less concerned with the opinions of others, and interested in fulfilling their potential. "What a man can be, he must be," Maslow explained, referring to the need people have to achieve their full potential as human beings. Maslow's said of self-actualization: "It may be loosely described as the full use and exploitation of talents, capabilities, potentialities, etc. Such people seem to be fulfilling themselves and to be doing the best that they are capable of doing. They are people who have developed or are developing to the full stature of which they are capable."

The peak level of Maslow's hierarchy is Transcendence 506. Transcendence includes spiritual needs that differ from other types of needs in that they can be met on multiple levels. When this need is met, it produces feelings of integrity and raises things to a higher plane of existence. Maslow tells us that by transcending you have a set of roots in your current culture but you are able to look over it as well and see other viewpoints and ideas. By these later ideas, one finds the fullest realization in giving oneself to something beyond oneself—for example, in altruism or spirituality. Maslow equated this with the desire to reach the infinite. "Transcendence refers to the very highest and most inclusive or holistic levels of human consciousness, behaving and relating, as ends rather than means, to oneself, to significant others, to human beings in general, to other species, to nature, and to the cosmos."

In FIG. 5, Security 502 and Survival 501 are seen as demotivators, as employees in these classifications are working to meet their own needs. They often pull down others who are aiming to be high performers in the workplace. They may have low skills and not want others to succeed because of it. New hires 511 often arrive at an organization at the Belong 503 level. In this exemplary figure, there are three employees 512 at the Security 502 level.

The Belonging 503, Importance 504, Self-Actualization 505, and Transcendence 506 levels are motivators, and as employees move up these levels they are increasingly motivated to excel in their employment. In the example in FIG. 5, there is one employee 513 at the Belonging 503 level, and seven employees 514 are at the Importance 504 level. Eight employees 515 are at the Self-Actualization 505 level, and two 516 are at the Transcendence 506 level.

Figure 6:
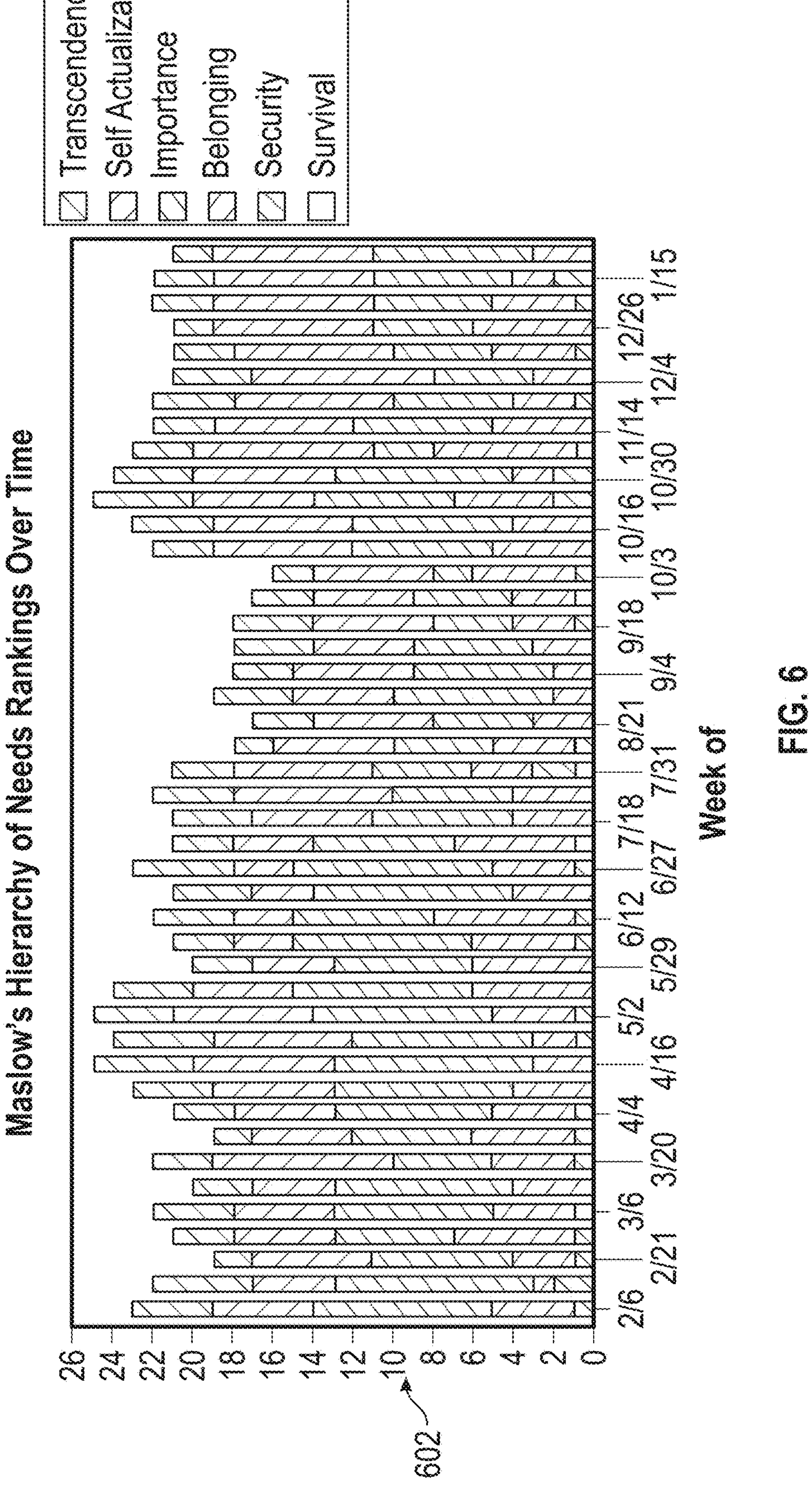
FIG. 6 is a detailed window view of an employee's Maslow Hierarchy status.

FIG. 6 shows the details, the micro view 103, of the Maslow Hierarchy 404 diagram. The weekly data 601 has the rating of the employees in a team along with the percentage of the team that are in the optimal Maslow Hierarchy level, Transcendence. Each of the Maslow Hierarchy levels are on the left of the table, with the lowest level on the top and the highest level on the bottom. This shows the team's psychological profile over time from the perspective of the Maslow Hierarchy levels.

The personalities over time chart 602 shows the number of employees on the left axis and the date on the bottom axis. Each line represents one Maslow Hierarchy level. The goal is to show few if any employees at the Survival or Security level, and more Self-Actualization and Transcendence employees than Belonging or Importance rated employees.

In other embodiments, the weekly data 601 and chart 602 could be accompanied (or replaced) by windows detailing an individual employee's performance. One screen could list the specific questions that lead to the determination of the employee's level. Another screen could show the employee's Maslow Hierarchy level over time. Still another screen could show recommendations on how to improve an employee's level.

Figure 7:
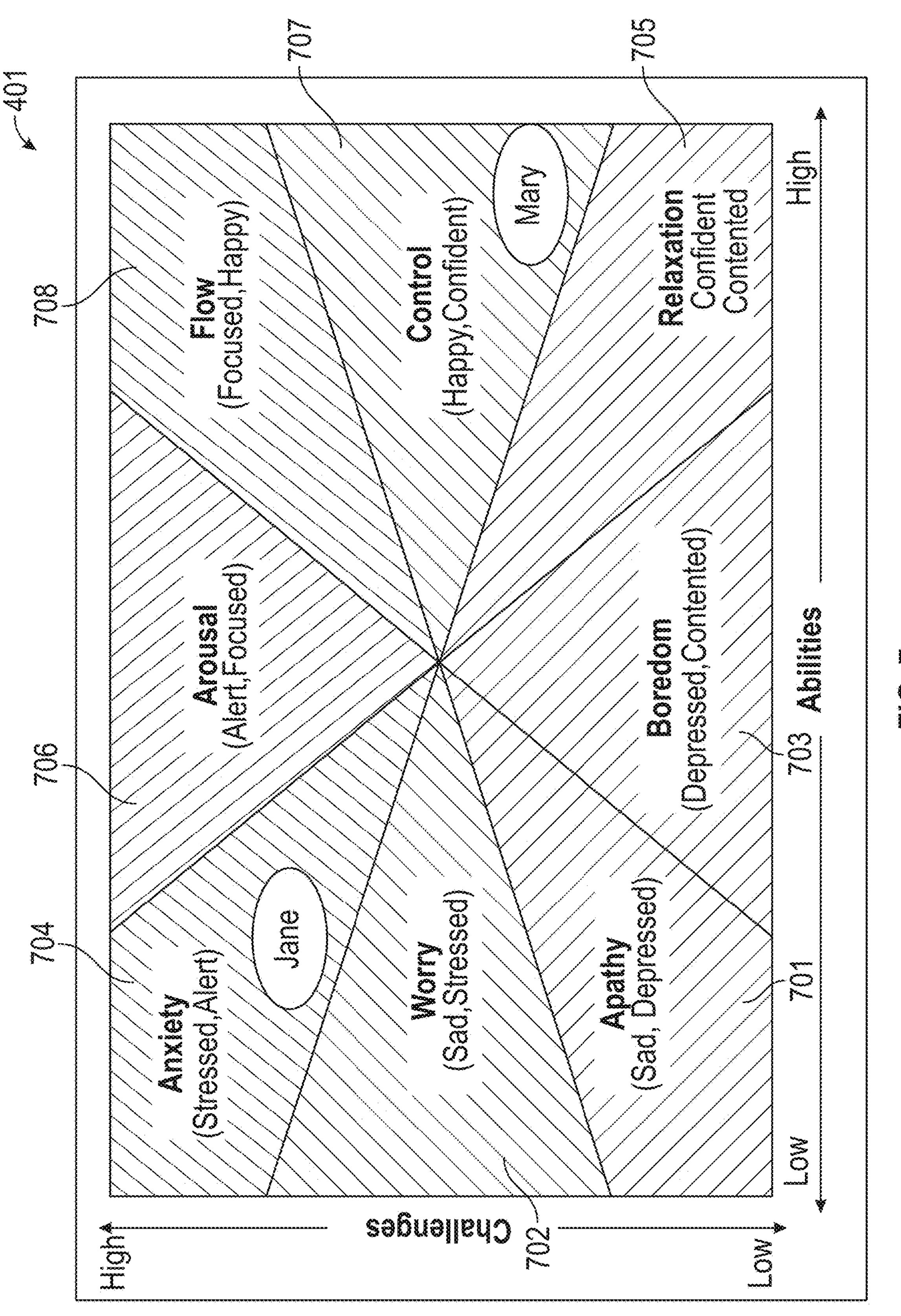
FIG. 7 is an overview of the Flow Map levels.

FIG. 7 is a Flow Map diagram used to show an employee's motivation status on a Flow Map diagram. The optimal state is Flow 708 where the employee has high ability, is challenged, and is thus focused and happy to perform the task at hand. The goal is to move the employee from lower states into the Flow 708 state to optimize performance. This is based on the work of Mihaly Csikszentmihalyi, who breaks up the work into eight segments: apathy 701, worry 702, boredom 703, anxiety 704, relaxation 705, arousal 706, control 707, and Flow 708.

Apathy 701 is a lack of feeling, emotion, interest, or concern about something. It is a state of indifference, or the suppression of emotions such as concern, excitement, motivation, or passion. An apathetic individual has an absence of interest in or concern about emotional, social, spiritual, philosophical, virtual, or physical life and the world. Apathy can also be defined as a person's lack of goal orientation. The apathetic may lack a sense of purpose, worth, or meaning in their life. In the workplace, this apathetic has low skills and low challenge, leading to low productivity.

Worry 702 is a category of perseverative cognition, i.e. a continuous thinking about negative events in the past or in the future. As an emotion "worry" is experienced from anxiety or concern about a real or imagined issue, often personal issues such as health or finances, or external broader issues such as environmental pollution, social structure, or technological change. It is a natural response to anticipated future problems. In the workplace, an employee reaches the worried 702 state when they have low abilities but challenges that they have trouble achieving. This state leads to lower productivity, more mistakes, and rework.

Boredom 703 is an emotion characterized by uninterest in one's surroundings, often caused by a lack of distractions or occupations. It is not simply another name for depression or apathy. Boredom is a specific mental state that people find unpleasant—a lack of stimulation that leaves them craving relief, with a host of behavioral, medical, and social consequences. In the workplace, the bored have abilities by insufficient challenge. The bored achieve the limited challenges before them, but could be significantly more productive with additional challenges.

Anxiety 704 is an emotion that is characterized by an unpleasant state of inner turmoil and includes feelings of dread over anticipated events. Anxiety is different from fear in that fear is defined as the emotional response to a real threat, whereas anxiety is the anticipation of a future threat. It is often accompanied by nervous behavior such as pacing back and forth, somatic complaints, and rumination. In the workplace, an employee reaches the anxiety 704 state when they have low abilities but high challenges that they have no ability to achieve. This state leads to lower productivity and high frustration. In a team situation, the anxious employee cannot provide the results in spite of high expectations.

Relaxation 705 is the opposite of Anxiety 704. Relaxation 705 is the emotional state of low tension, in which there is an absence of Arousal, particularly from negative sources such as anger, anxiety, or fear. In the workplace, the relaxed have high skill abilities but insufficient challenge. The relaxed achieve the limited challenges before them with ease, but could be significantly more productive with additional challenges.

Arousal 706 is the physiological and psychological state of being awoken or of sense organs stimulated to a point of perception. It involves activation of the ascending reticular activating system (ARAS) in the brain, which mediates wakefulness, the autonomic nervous system, and the endocrine system, leading to increased heart rate and blood pressure and a condition of sensory alertness, desire, mobility, and reactivity. The aroused have high challenges and moderate skill levels, creating an alert and focused approach to work tasks. The aroused tend to be as productive as their skill level allows.

Control 707 is a person's ability or perception of their ability to affect themselves, others, their conditions, their environment, or some other circumstance. Control over oneself or others can extend to the regulation of emotions, thoughts, actions, impulses, memory, attention, or experiences. In the workplace, Control 707 reflects the employee with a high level of skill and moderate challenges. The control employee achieves all that is asked but could increase productivity if more challenges are presented.

Flow 708 is the desired state for an employee so that productivity can be maximized. Flow 708 is the mental state in which a person performing some activity is fully immersed in a feeling of energized focus, full involvement, and enjoyment in the process of the activity. In essence, Flow is characterized by the complete absorption in what one does and a resulting transformation that can be measured in one's sense of time. Flow 708 is the melting together of action and consciousness; the state of finding a balance between a skill and how challenging that task is. It requires a high level of concentration. Flow is used as a coping skill for stress and anxiety when productively pursuing a form of leisure that matches one's skill set.

In the Flow Map 401 diagram screen, the employee or set of employees are placed in one section of the Flow Map 401 diagram. For instance, see Jane and Mary's placement on the chart. Based on the placement, Mary could benefit by being offered additional challenges in her work, moving her to the Flow 708 section. Jane is being challenged beyond her abilities, and additional training may increase her job satisfaction and her performance.

Figure 8:
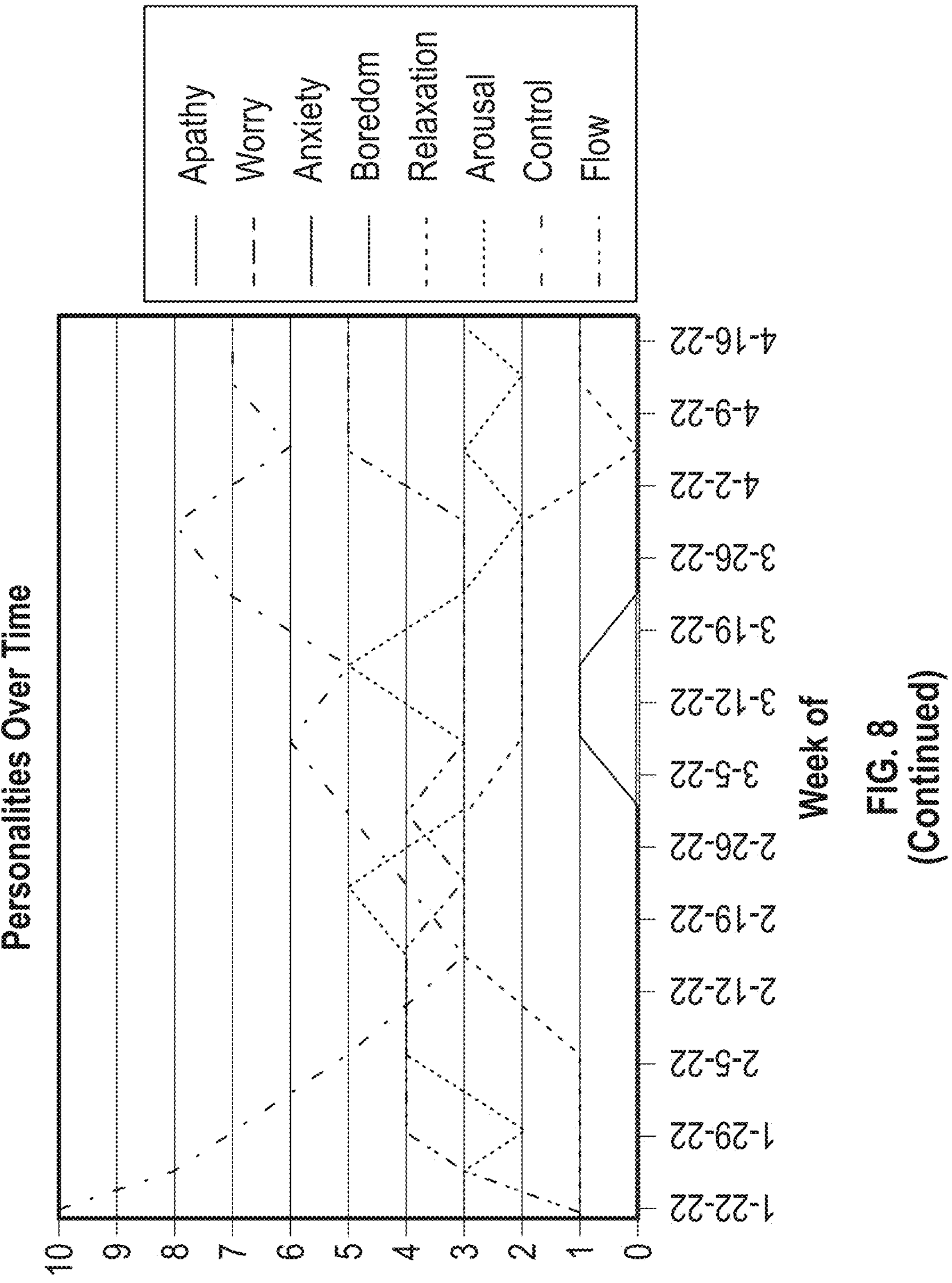
FIG. 8 is a detailed view of an employee's Flow Map levels.

FIG. 8 is the micro view 103 of the Flow Map 401 diagram. This computer window shows the specific performance of a team over time using the Flow Map 401 methodology in a chart 801. The left column has the eight levels of the Flow Map 401 methodology. Next to each level is a number in parentheses. This number is a quantification of the motivation, or productivity, of an employee at that level. For instance, an employee at the Apathy level may only produce 20% of their potential, whereas someone at Flow may produce 150% of their normal productivity.

In chart 801, the number of employees at each level in the Flow Map 401 chart is shown across various dates. In this chart 801, there is one employee at Relaxation on Jan. 22, 2022, three employees at Arousal, ten at Control level, and one at Flow. The next cell shows that there are 15 employees in this team, and 6.67% are in Flow.

Chart 802 shows the personalities of the team over time, as a line chart. The lines in the chart reflect the eight levels of the Flow Map 401 methodology. The x-axis shows the dates of each sample, and the height of the line reflects the number of employees at that level.

In other embodiments, chart 801 and chart 802 could be accompanied (or replaced) by windows detailing an individual employee's performance. One screen could list the specific questions that lead to the determination of the employee's level. Another screen could show the employee's Flow Map level over time. Still another screen could show recommendations on how to improve an employee's Flow Map level.

Figure 9:
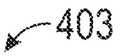
FIG. 9 is an overview of the Purpose Venn Diagram levels.
Figure 9:
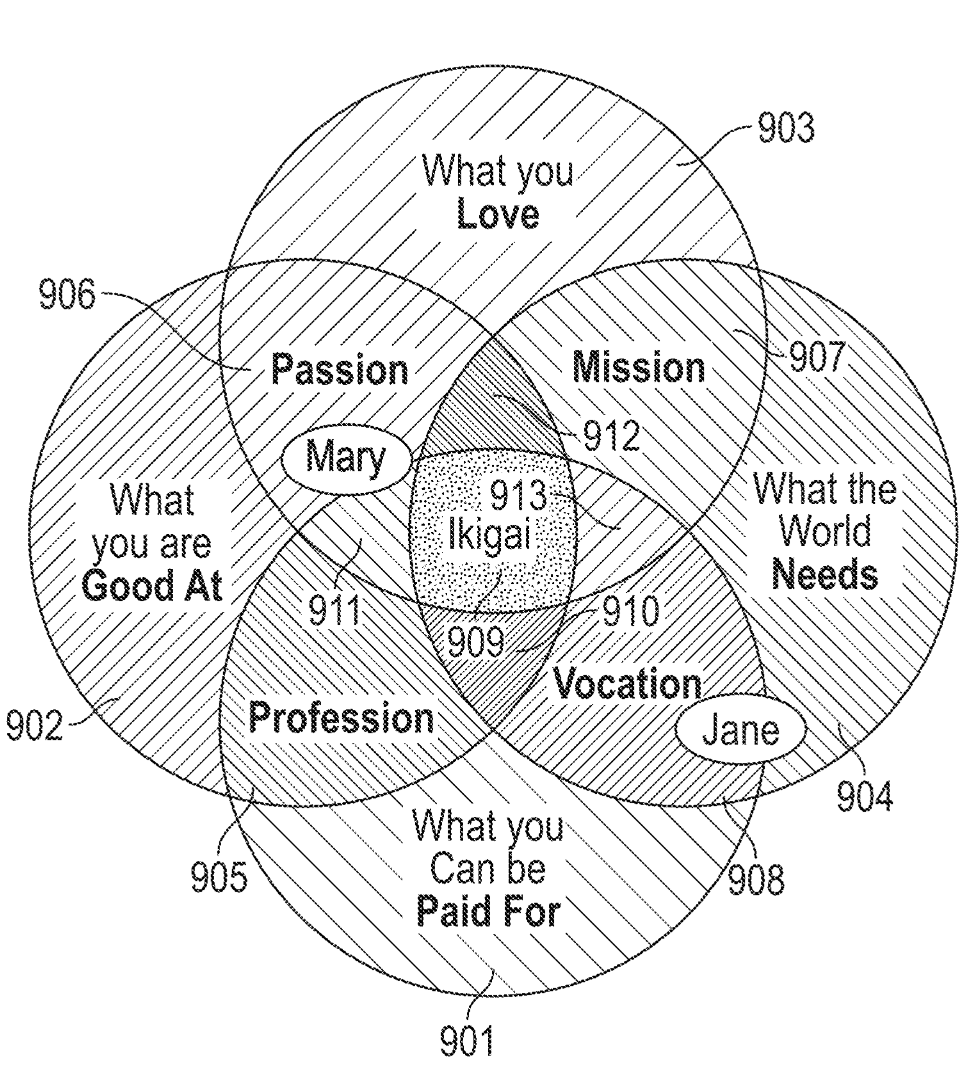

FIG. 9 shows a Purpose Venn 403 or Ikigai diagram. Ikigai is a Japanese concept referring to something that gives a person a sense of purpose, a reason for living, or in this case, a purpose in their employment. The Purpose Venn 403 diagram can be viewed as four major sections: what an employee can be Paid For 901, what an employee is Good At 902, what an employee Loves 903, and what the world Needs 904. These circles overlap, and the area where all four major sections converge is Ikigai 909, where an employee is doing what the world Needs 904, doing what the employee Loves 903, where the employee is Good At the work 902, and doing work that they can be Paid For 901. Ikigai is a Japanese term that blends two words: "iki" meaning "to live," and "gai" meaning "reason," which translates to "a reason to live." It's a concept that encourages people to discover what truly matters to them and to live a life filled with purpose and joy.

At the intersection of what is Paid For 901 and what the employee is Good At is the employee's Profession 905. The intersection of what the employee is Good At 902 and what they love is Passion 906. The intersection of what the employee Loves 903 and what the world Needs 904 is Mission 907. The intersection of what the world Needs 904 and what can be Paid For 901 is Vocation 908.

As the employee approaches Ikigai 909, there are four sections where three of the major sections are present, but one is missing. The employee could be comfortable but feeling empty 910 because they are doing something that they are Good At, that the world Needs, and that they are Paid For, but do not Love doing the work. In another section, they could feel satisfaction but feel useless 911, because the world does not Need what they are doing, even though they are Good At it, Love doing it, and are Paid For it. In another section, the employee could feel delighted and fullness in their work, but achieve no wealth from the work 912 because it is not a task that can be Paid For, even though the word Needs it, they are Good At it, and they Love doing it. The final section has excitement and complacency, with uncertainty 913, because the employee is not Good At the task, even though they Love doing it, the world Needs it, and they are Paid For it.

Moving an employee to peak performance involves moving the employee to Ikigai 909 (sometimes called Purpose), but adjusting tasks to something that the world needs, that the employee is Good At, and that the employee Loves doing, while Paid For the work. The Purpose Venn 403 diagram shows employees Mary and Jane on the chart, providing the employer with information on what adjustments need to be made to move each to Ikigai 909.

Figure 10:
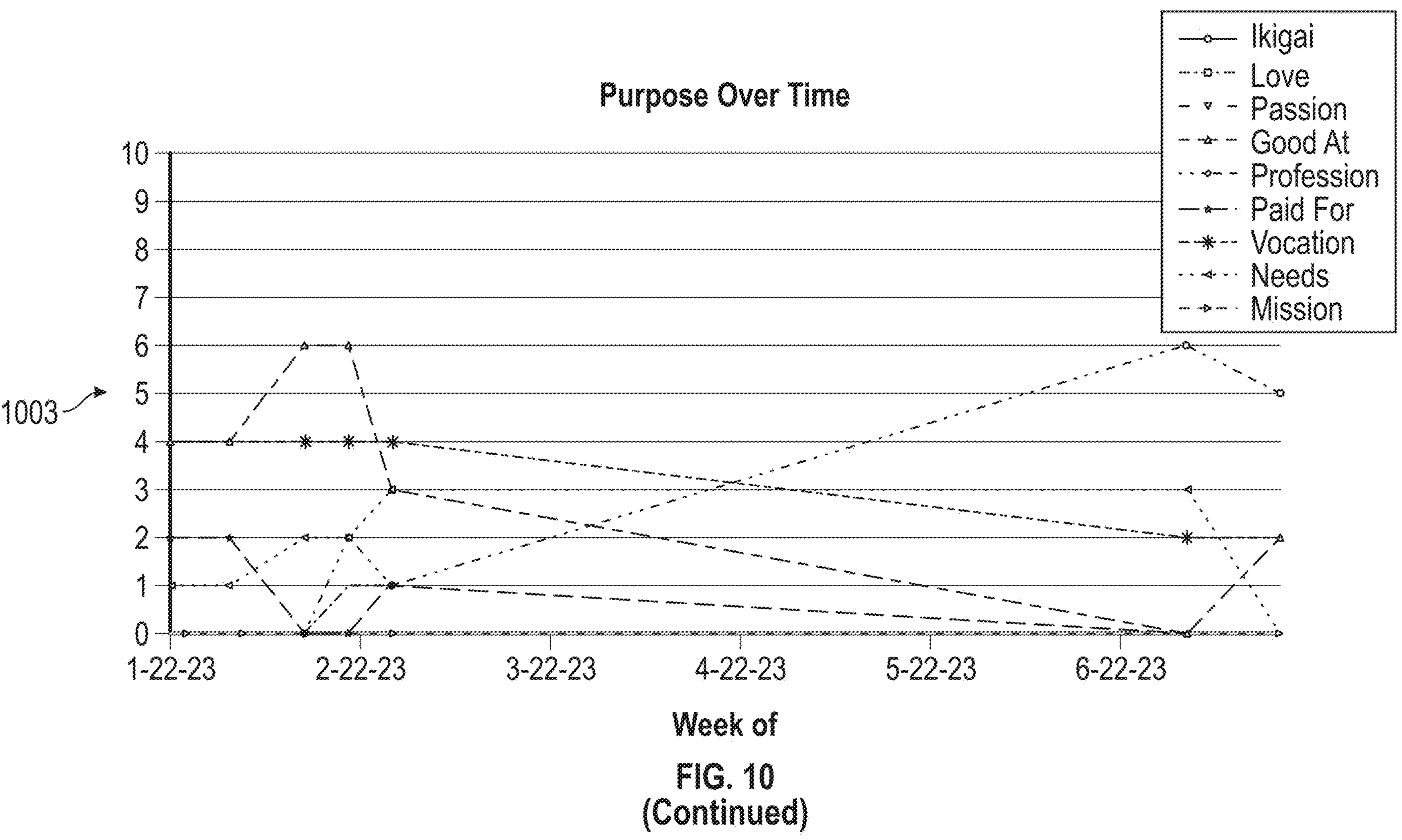
FIG. 10 is a detailed view of an employee's Purpose Venn Diagram levels.

In FIG. 10, the micro view 103 of the Purpose Venn 403 diagram is seen. This computer window shows the specific performance of a team over time using the Purpose Venn 403 methodology. The left column of chart 1001 has the eight levels of the Purpose Venn 403 methodology.

In chart 1001, the number of employees at each level in the Purpose Venn Diagram 403 chart is shown across various dates. In this chart 1001, there are two employees at the Ikigai level on Jan. 22, 2023, four employees at Passion, two at the Good At level, four at Profession, one at Paid For, two at Vocation, and four at Mission. The next cell shows that there are nineteen employees in this team, and 31.58% are in the Mission category.

Chart 1003 shows the purpose of the Purpose Venn Diagram 403 methodology. The x-axis shows the dates of each sample, and the height of the line reflects the number of employees at that level.

In other embodiments, chart 1001 and chart 1003 could be accompanied (or replaced) by windows detailing an individual employee's performance. One screen could list the specific questions that lead to the determination of the employee's Purpose Venn Diagram score. Another screen could show the employee's Purpose Venn Diagram score over time. Still another screen could show recommendations on how to improve an employee's score.

Figure 11:
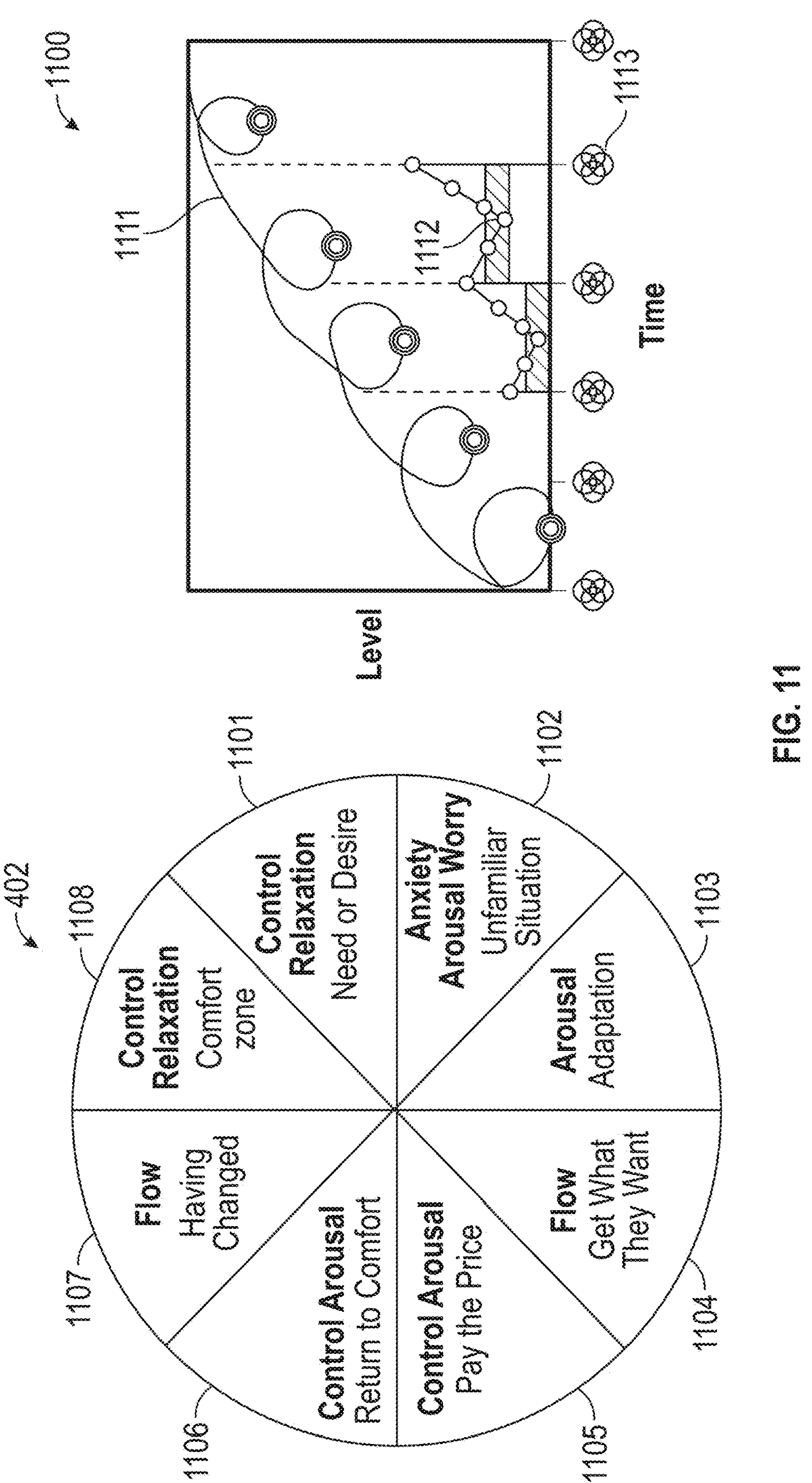
FIG. 11 is an overview of the Hero's Journey levels.

FIG. 11 shows a Hero's Journey 402 diagram, with eight sections. This diagram represents a continuum, with the employee moving through the circle to the next level of improvement. The employee starts with a Need or Desire 1101 while in a controlled state of relaxation. This Need or Desire 1101 pushes the employee into an Unfamiliar Situation 1102, causing anxiety, worry, and arousal. This leads to Adaption 1103, and arousal. Following this state, the employee Gets What They Want 1104, and achieves a level for Flow. But there is a price to pay 1105 for the change, creating control or arousal. The next stage is a return to comfort 1106, with control and arousal. Then the employee moves to a Having Changed 1107 state, with Flow. And finally, the employee enters Comfort Zone 1108, a state of control and relaxation.

The theosis chart 1100 is a different view of the Hero's Journey 402 diagram over time 1111. As the employee (or organization) improves, they cycle through s Journey 402 for each improvement. To move to the next level of Purpose Venn Diagram 403 or Maslow's Hierarchy 404, the employee needs to move through desire 1101 to move out of the Comfort Zone 1108. They then need to travel through Unfamiliar Situation 1102, adaption 1103, get what they want 1104, price 1105, comfort 1106, having changed 1107, and back to Comfort Zone 1108. This is seen in the Theosis line 1111 in the theosis chart 1100 as the employee moves to a higher level.

The horizontal axis 1113 of the theosis chart is a Purpose Venn 403 or Ikigai diagram, showing the employees status as they grow through the Hero's Journey 402 diagram 1111. Alternatively, or simultaneously, the Maslow levels 404 could be used on the horizontal axis.

A separate comfort chart 1112 is also shown in FIG. 11. This shows that the employee is uncomfortable as they traverse the Unfamiliar Situation 1102, adaption 1103, get what they want 1104, and pay the price 1105 levels on their way to better times in the comfort 1106, having changed 1107, and Comfort Zone 1108 levels.

Figure 12:
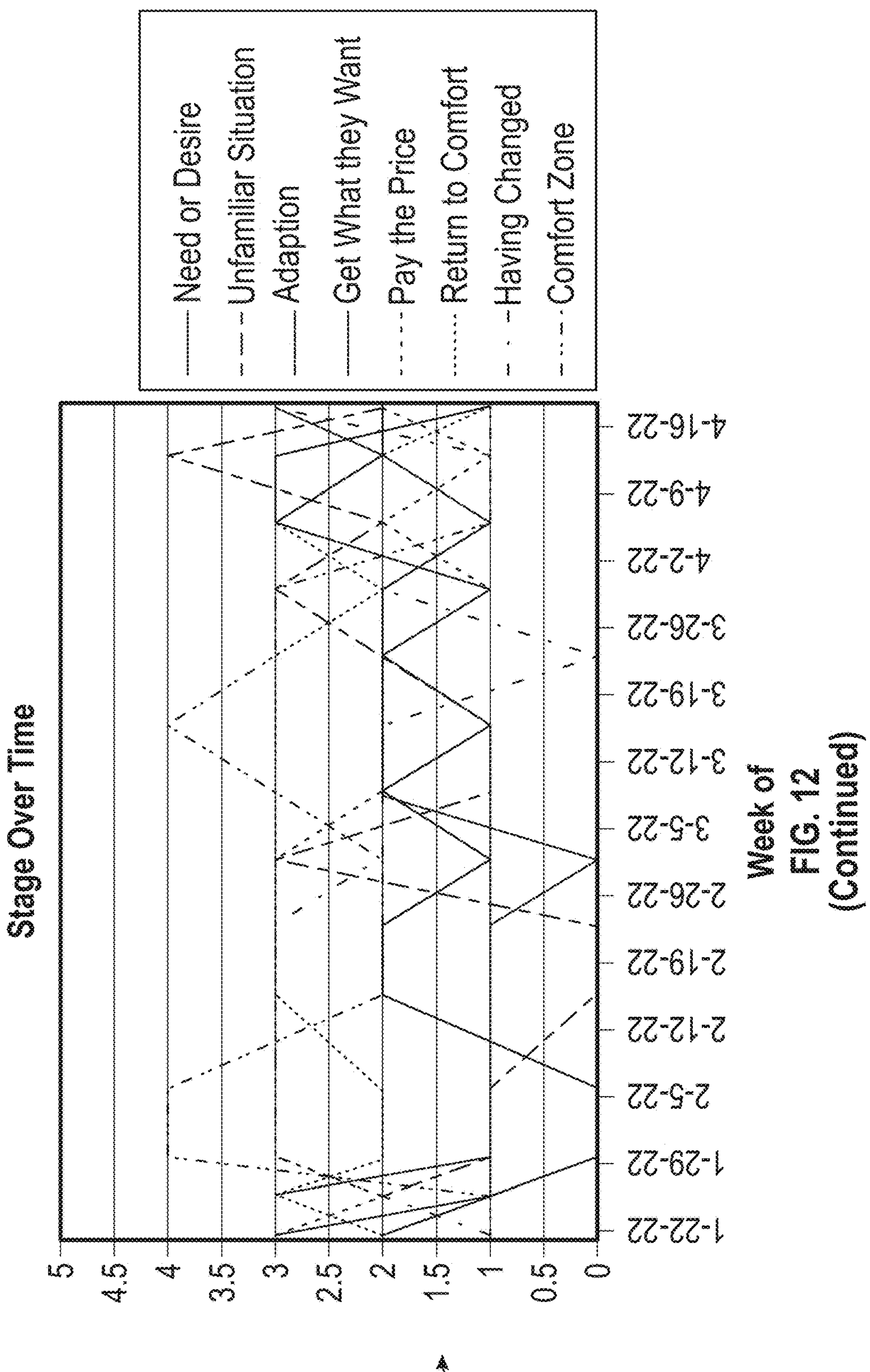
FIG. 12 is a detailed view of an employee's Hero's Journey levels.

In FIG. 12, the micro view 103 of the Hero's Journey 402 diagram is seen. This computer window shows the specific stage of change of a team over time using the Hero's Journey 402 methodology. The left column of chart 1201 has the eight levels of the Hero's Journey 402 methodology.

In chart 1201, the number of employees at each level in the Hero's Journey 402 chart is shown across various dates. In this chart 1201, there are two employees at the Need or Desire 1101 level on Jan. 22, 2023, one employee at the Unfamiliar Situation 1102 stage, three at the Adaption 1103 level, two at Get what they want 1104, three at Pay the price 1105, two at Return to comfort 1106, one at Having Changed 1107, and one in the Comfort Zone 1108. The next cell shows that there are fifteen employees in this team, and 6.67% are in the Comfort Zone 1108 category.

Chart 1202 shows the stage over time of the Hero's Journey 402 methodology. The x-axis shows the dates of each sample, and the height of the line reflects the number of employees at that level.

In other embodiments, chart 1201 and chart 1202 could be accompanied (or replaced) by windows detailing an individual employee's performance. One screen could list the specific questions that lead to the determination of the employee's Hero's Journey 402 stage. Another screen could show the employee's Hero's Journey 402 stage over time. Still another screen could show recommendations on how to move an employee out of their comfort zone to make a change.

Figure 13:
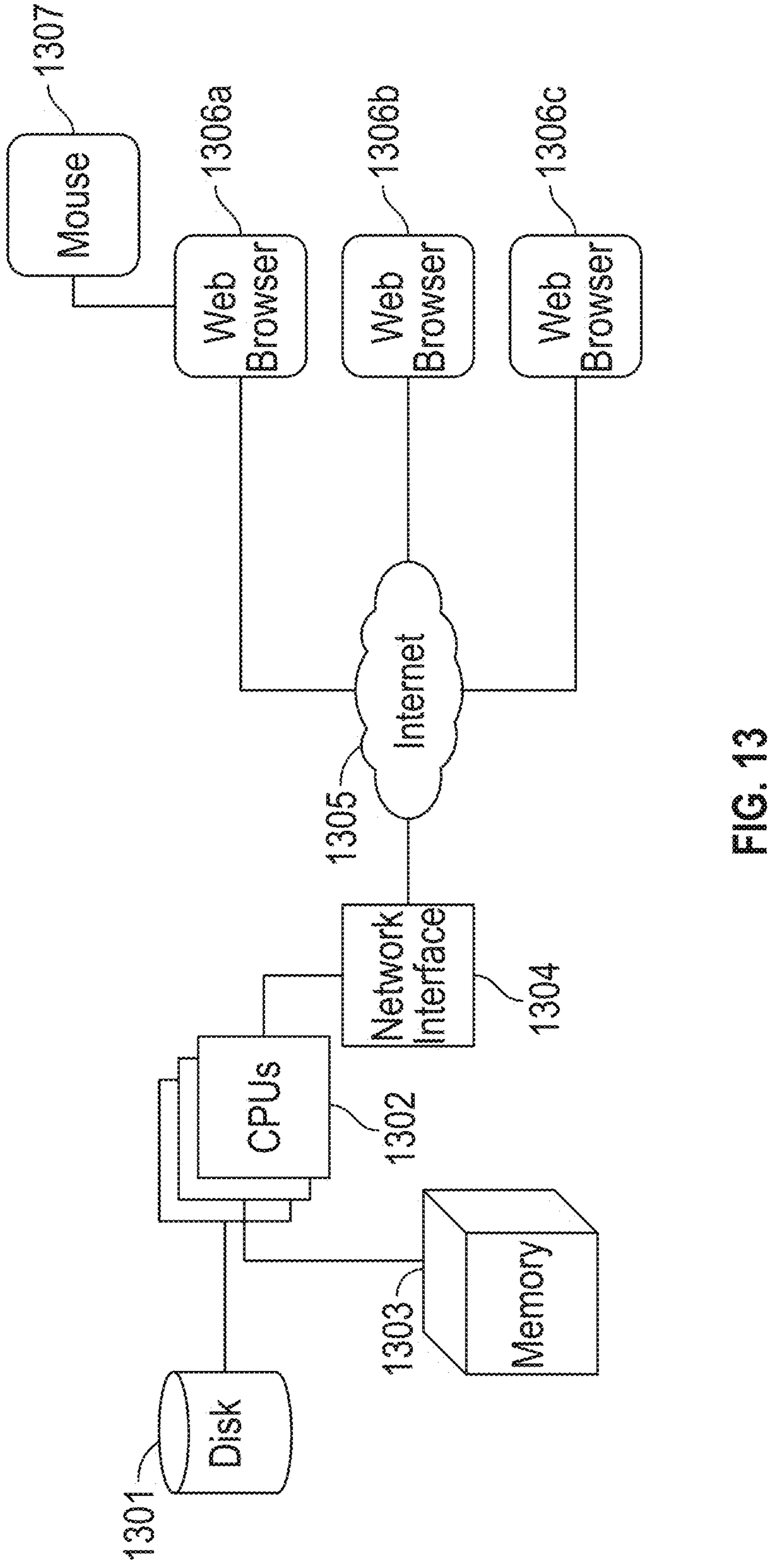
FIG. 13 is a block diagram of a possible hardware implementation.

Looking at FIG. 13, we see one possible embodiment of the hardware components to implement the software functionality described herein. In one embodiment, the employee data (see FIG. 15) is stored in data structures 1500 on a disk 1301. The disk could be any type of data storage device, from a RAID disk array to a hard drive to optical storage to a solid state drive to tape drives to other data storage devices. The disk 1301 is connected to one or more processing units 1302. The disk 1301 could be local or remote, accessible through the network interface 1304 over a network, such as Internet 1305. In some embodiments, the disk 1301 is distributed across different storage units either locally or remotely. The connection could be optical, electrical, wireless, or similar type of connection. The processing units 1302 could be microprocessors, ASIC, processing cores, or similar. The processing units 1302 could be connected (electrically, optically, or wirelessly) to a memory 1303 and a network interface 1304. The disk 1301 could store the data structures 1500 in FIG. 15. The memory 1303 could be random access memory, EEPROM, PROM, NVROM, etc. The network interface 1304 could be any interface to a computer network. The network interface 1304 could be an optical connection, an electrical connection, or a wireless connection. The network interface 1304 could connect to an Ethernet network (IEEE 802.1, 802.3), to a WiFi network (IEEE 802.11), Bluetooth, Broadband through cable modems, mesh network, cellular network, or other network protocols. The processing units 1302 may also connect directly to a computer screen. The computer screen may have a mouse, touch screen, touchpad, keyboard, haptic device, or other input device.

In one embodiment, the network interface 1304 could connect to the Internet 1305 and through the Internet 1305 to web browsers 1306*a*, 1306*b*, 1306*c*. Web browsers 1306*a*, 1306*b*, 1306*c* could have various input devices, such as a computer mouse 1307, touch screens, touch pads, keyboards, haptic devices, or similar. Web browsers 1306*a*, 1306*b*, and 1306*c* could have screens, monitors, projection devices, or similar display technology.

Figure 14:
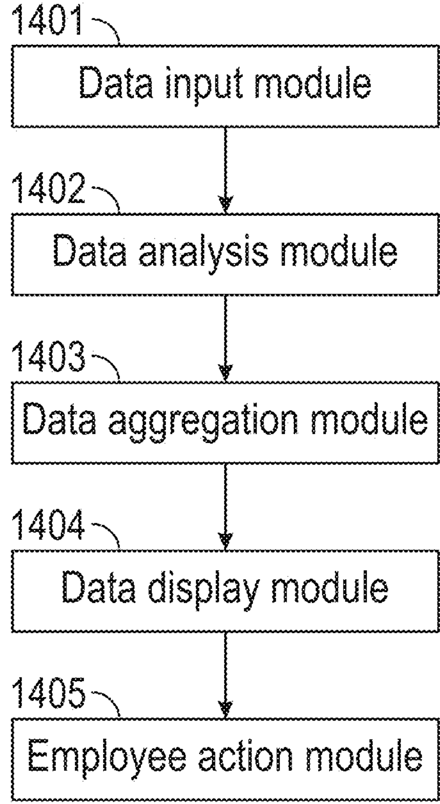
FIG. 14 is a block diagram of a possible functional implementation.

One embodiment of a high-level software architecture can be seen in FIG. 14. The Data input module 1401 gathers data to fill the data structures 1500 seen in FIG. 15. The data input module 1401 may operate on a web browser 1306*a*, 1306*b*, 1306*c* and may gather information from an employee, a manager, a human resource professional, or similar. The data collected relates to the personality, emotions, moods, and stages of changes that the employee is experiencing. See FIG. 2 for a sample of questions that may be asked. In some embodiments, one person answers the questions for each employee; in other embodiments, questions may be answered by other employees, managers, the employee themselves, and others, and the data aggregated into the data structures 1500 in FIG. 15. In some embodiments, free text observations replace the questions. In still other embodiments, both questions and free text observations are used.

Once the data is collected (in some embodiments, this is done in parallel with data input module 1401), the data may be analyzed in a Data analysis module 1402. The data analysis module 1402 converts the data for an individual employee into a Maslow Hierarchy 404 score, a Flow Map 401 rating, a Purpose Venn Diagram 403 score, and a Hero's Journey 402 stage. The data analysis module 1402 algorithm is described further in FIG. 16.

After or in parallel with the data analysis module 1402, the data is aggregated with the data aggregation module 1403. The data aggregation module 1403 loops through each employee in each team throughout the organization, combining the individual employee scores into a team score.

$$\textit{Maslow}\ \text{Score}_{organization} = \frac{\sum_{x=1}^{Number\ of\ teams} \frac{\sum_{x=1}^{Employees\ per\ team} \textit{Maslow}\ \text{score}}{\text{Employees per team}}}{\text{Number of teams}}$$

A similar score could be created for the Flow Map 401 ratings, the Hero's Journey 402 stages, and the Purpose Venn Diagram 403 scores. The team scores at each level of the organization could be calculated and stored in the data structures 1500 shown in FIG. 15.

The data is presented to the user through a Data display module 1404. The data display module 1404 reads the data from the data structures 1500 in FIG. 15 and provides this data to the user. The user could be a manager or senior executive looking to determine the characteristics of the employee base. In other embodiments, individual employees may look at their performance and improvements over time, and some embodiments may allow an employee to see the performance of the overall organization and their team, perhaps with aggregated data so that other individual employees' information is not readily visible. The display may be on the web browsers 1306*a*, 1306*b*, 1306*c* or on a local display device. Examples of the display can be seen in FIGS. 1, 3-12.

An additional module, the Employee action module 1405, may be present in the system to provide feedback to employees and managers on actions that can be taken to improve the employee's Maslow Hierarchy 404 score, Flow Map 401 rating, Purpose Venn Diagram 403 score, and Hero's Journey 402 stage. In some embodiments, this module takes an individual score profile and does a database lookup of suggestions for improvement.

For instance, if an employee is in the Flow Map Anxiety 704 state, the Employee action module 1405 could suggest a box breathing tool or a releasing statement tool. If the employee is having difficulty completing tasks or reaching goals, the Employee action module 1405 could suggest a tool to break down the mountain. The Employee action module 1405 could suggest the glowing choices game if the employee has difficulty with the unpredictability of the environment, a 3G debrief game if the employee is having trouble with empowerment, or a follow the leader game if the employee is having trouble feeling accomplished.

TABLE 3

| Current Flow State | Desired Flow State | Tools | Games |
|---|---|---|---|
| Anxiety 704 | Arousal 706 | Box Breathe Releasing Statement, Break Down the Mountain | Glowing choices, 3G Debrief, Follow the Leader |
| Arousal 706 | Flow 708 | Box Breathe, Laughter/Banter, Encouragement | Glowing choices, 3G Debrief, Appointment Dynamics |
| Flow 708 | Flow 708 | Intrinsic Motivation, Recognition, Challenges around Ikigai | House, Disney Character Role Play, I Spy |
| Control 707 | Flow 708 or Arousal 706 | Concentric Visualization, Artisan Abilities, Reality Check | Draw Something/This or That, RM Quest, Countdown Timer |
| Relaxation 705 | Control 707 or Arousal 706 | Artisan Development, Artisan Abilities, Pop Quiz | Draw Something/This or That, Build from Scratch, Countdown Timer |
| Boredom 703 | Relaxation 705 or Arousal 706 | Silver Lining Discussion, Reality Check, Challenges Around Ikigai | Countdown Timer, Build from Scratch, Appointment Dynamics |
| Apathy 701 | Relaxation 705 or Anxiety 704 | Faith/Focus Discussion, Diamond in the Rough, Hope | RM Quest, 3G Debrief, Glowing Choice |
| Worry702 | Anxiety 704 | Self-compassion, Encouragement, Faith/Focus Discussion | Follow the Leader, 3G Debrief, Glowing Choices |

The Employee action module 1405 could make similar suggestions to make improvements in the employee for their Maslow Hierarchy 404 score, Purpose Venn Diagram 403 score, and Hero's Journey 402 stage. For further example, to improve a Maslow Hierarchy 404 score from Survival 501 to Security 502, the Employee action module 1405 may suggest finding commonalities within their Ikigai to apply and call forth; having discussions around what brings them fulfillment; encouragement; giving badges that reinforce positive behavior. The Employee action module 1405 may suggest asking questions such as: What do they need from a leadership standpoint? Are they building positive relationships?

To move an employee from Security 502 to Belonging 503, the Employee action module 1405 may suggest finding commonalities within their ikigai to apply and call forth; having discussions around what brings them fulfillment; encouragement; and giving badges that reinforce positive behavior. The Employee action module 1405 may suggest asking questions such as: What do they need from a leadership standpoint? Are they building positive relationships?

Moving from Belonging 503 to Importance 504 may lead to suggestions to have the employee connect on a larger scale with customers and encouragement to create to inspire in everything they do; give goals leading to mastery of skill; Google reviews/customer testimonies; and tie examples of what they are doing to the higher purpose.

To transition from Importance 504 to Self-Actualization 505, the Employee action module 1405 may suggest inspiring others to do their best around mission, vision, and core values; finding Flow; modeling behavior and calling for the mission, vision, and core values; and encouraging the employee to call forth their higher self worth and recognizing positive behavior around the mission/vision.

In another embodiment, a machine learning algorithm, such as random forest, K-means, Densicube (see U.S. Pat. No. 11,416,713), or neural networks are used to suggest courses of action. Feedback in the following weeks after a suggestion can be used to tune the model to improve the results.

In one embodiment, the employee data may be restricted due to the General Data Protection Regulations in the European Union. In this situation, the data needed to perform the training of the machine learning algorithms needs to be kept separate to ensure compliance with the regulations. For instance, personally identifiable information can not be sent out of the European Union. This creates a problem when building and maintaining data models. Paul Green and Jerzy Bala solved this problem with U.S. Pat. No. 11,609,971 (incorporated herein by reference) by creating a machine learning engine that operates in different countries and only creates the overall machine learning model from the parameters separately determined in separate locations.

Figure 15:
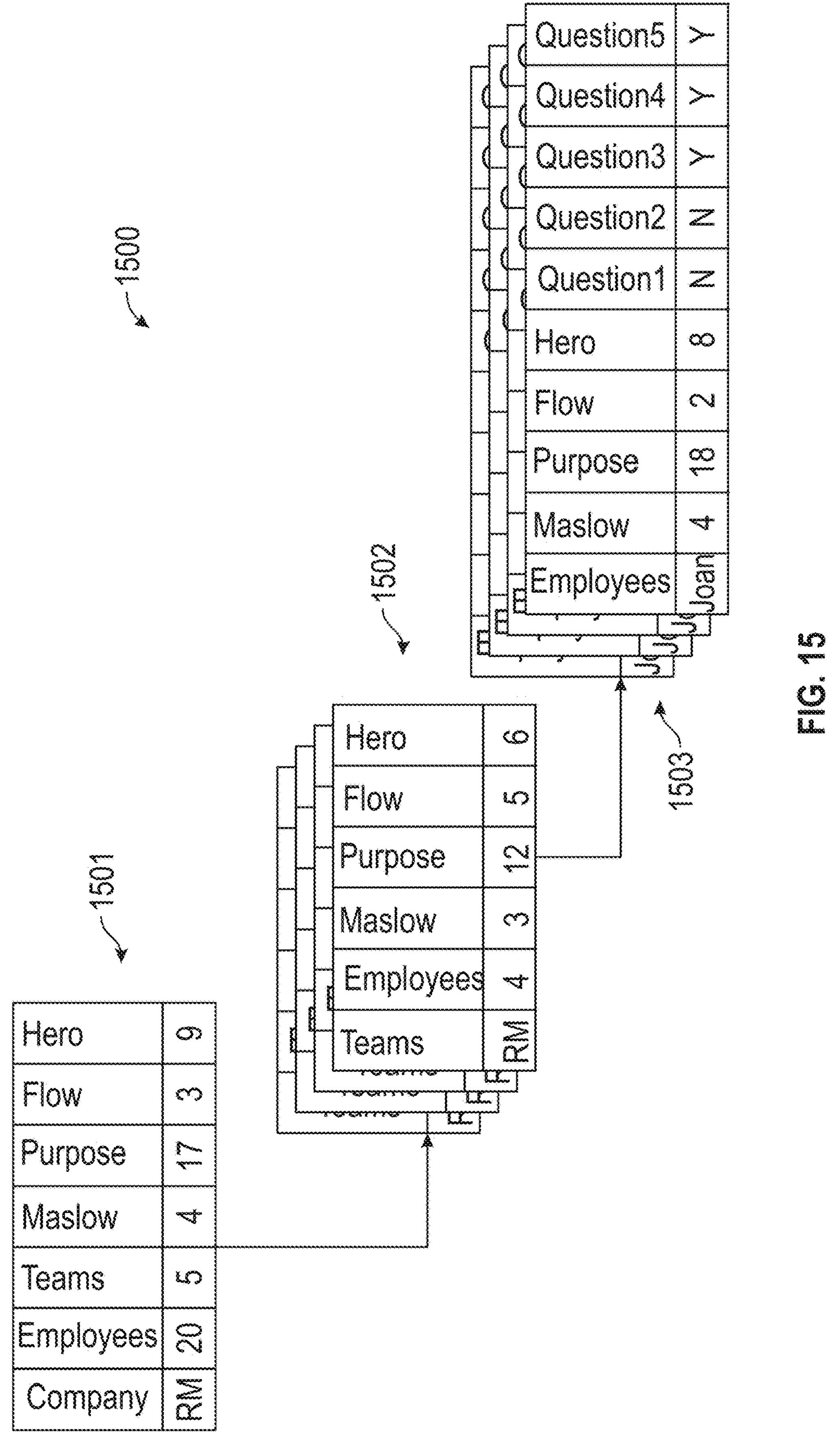
FIG. 15 is a possible data structure for implementing these inventions.

FIG. 15 shows one embodiment of a data set 1500 for storing the employee data in the disk 1301. This structure could be a single database or a distributed database. The data structure 1500 could have three layers, the organizational data structure 1501, the team data structure 1502, and the employee data structure 1503. Additional layers between the organizational data structure 1501 and the team data structure 1502 may be implemented for larger, more complex organizations.

The organizational data structure 1501 is the top-level data structure. It contains fields for the company name and other information about the organization, a count of the employees, and a count of the teams. These counts could be calculated by traversing the team data structure 1502 and summing the employee counts. The data aggregation module 1403 maintains the fields for Maslow Hierarchy, Purpose Venn Diagram, Flow Map, and Hero's Journey, as described above. In some embodiments, the Maslow Hierarchy, Purpose Venn Diagram, Flow Map, and Hero's Journey are stored with a date code and are periodically (or randomly) preserved in the organizational data structure 1501, perhaps through a linked list. The data display module 1404 uses this data to show the highest-level screen 100 and other screens off of that screen. The organizational data structure 1501 also has a pointer to the team data structure 1502. In one embodiment, this pointer is a link to a linked list of a plurality of team data structures 1502.

Each of the team data structures 1502 could contain fields with the team name and other information about the team, information about the team leader, and a count of the employees. The team data structure 1502 has fields for Maslow Hierarchy, Purpose Venn Diagram, Flow Map, and Hero's Journey as maintained by the data aggregation module 1403. In some embodiments, the Maslow Hierarchy, Purpose Venn Diagram, Flow Map, and Hero's Journey are stored with a date code and are periodically (or randomly) preserved in the team data structure 1502, perhaps through a linked list. The team data structure 1502 also could contain a link to a linked list of a plurality of employee data structures 1503.

The employee data structures 1503 could each contain fields with the employee's name and other information regarding the employee. The employee data structure 1503 has fields for Maslow Hierarchy, Purpose Venn Diagram, Flow Map, and Hero's Journey as maintained by the data aggregation module 1403. In some embodiments, the Maslow Hierarchy, Purpose Venn Diagram, Flow Map, and Hero's Journey scores are stored with a date code and are periodically (or randomly) preserved in the employee data structures 1503, perhaps through a linked list. In addition, each answer to each question that is used to determine the employee's Maslow Hierarchy 404 score, Flow Map 401 rating, Purpose Venn Diagram 403 score, and Hero's Journey 402 stage may be preserved in the employee data structures 1503. In some embodiments, each answer to each question may be periodically (or randomly) preserved with a data code in the employee data structures 1503, perhaps through a linked list.

Figure 16:
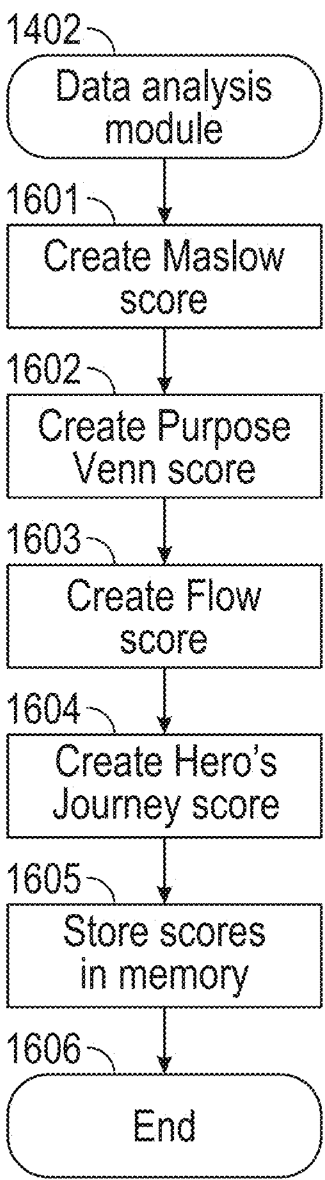
FIG. 16 is a detailed flow chart of the data analysis module.

FIG. 16 details the steps that the data analysis module 1402 undertakes to determine the various scores. Each takes the data from the employee data structures 1503 questions, using the most recent data. The data came from the data input module 1401.

The first step in the data analysis module 1402 is to determine the Maslow Hierarchy level 1601. In some embodiments, the answers to the questions are pointed and directed to a specific level. For instance, the questions in Table 1 are sorted and directed to specific levels. If three of the questions for Self-Actualization are affirmatively answered, the Maslow Hierarchy level 1601 determination is made that the employee is in the self-actualization level. In some embodiments, two of the three affirmative answers are required to make the determination.

In another embodiment, each answer in the entire set of questions listed in TABLE 1 is given a weight, and the weights are multiplied by the answer, and the products are summed. In some embodiments, all of the weights are equal. In other embodiments, the weights are different. The product is then compared to a table of levels; all products over the value of a level are assigned to that level. For example, see TABLE 4 for the questions in TABLE 1.

TABLE 4

| LEVEL | NUMBER OF QUESTIONS AFFIRMATIVELY ANSWERED |
|---|---|
| Transcendence | 19-20 |
| Self-Actualization | 17-18 |
| Importance | 13-16 |
| Belonging | 8-12 |
| Security | 5-7 |
| Survival | 0-4 |

In another embodiment, the questions asked require free-text answers. These answers could be interpreted through natural language processing. First, the test of the narrative is parsed into a table of words. This could use traditional parsing techniques of searching for delimiters such as spaces, periods, tabs, commas, and other punctuation types. The strings between the delimiters are stored in a table. In some descriptions, this is called tokenization.

The words in the table are next analyzed to convert the word into its stem by removing parts of speech that are attached to the word, such as plurality. Some descriptions call finding this process lemmatization—figuring out the most basic form or lemma of each word in the sentence. For some models, the word is categorized as a noun, verb, adverb, adjective, etc.

Next, each word stem is looked up in the model's database of stems, and the corresponding weight of the word in the database is copied into the narrative's table of words. In a simple model, the weights are averaged to create a Maslow-level score. More complicated models could use other statistical methods to determine the Maslow-level score. For instance, verbs could be given more weight than adverbs, or a mean could be used rather than an average. The Maslow Hierarchy level score could then be compared to a level to determine the Maslow Hierarchy level, similar to the levels in TABLE 4.

The data analysis module 1402 then determines the Purpose Venn Diagram score 1602. One of the three methods described for the Maslow Hierarchy level 1601 determination could be used, but based on the questions in TABLE 2.

Similarly, the Flow Map rating 1603 and the Hero's Journey stage 1604 are calculated as described above, with different questions.

Once each of the Maslow Hierarchy scores, the Flow Map rating, the Purpose Venn Diagram score, and the Hero's Journey stage are determined, the scores are stored 1605 in the employee data structures 1503, and the data analysis module ends 1606.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies.

The foregoing devices and operations, including their implementation, will be familiar to, and understood by, those having ordinary skill in the art. This specification contains numerous dimensions, all of which could be changed without deviating from the inventions herein.

The above description of the embodiments, alternative embodiments, and specific examples, are given by way of illustration and should not be viewed as limiting. Further, many changes and modifications within the scope of the present embodiments may be made without departing from the spirit thereof, and the present inventions include such changes and modifications.

The invention claimed is:

1. A computing device comprising a memory and a display device, the memory including machine-readable non-transitory instructions to instruct the computing device to:

display a macro view of a company on the display device, the macro view comprising a representation of an organizational chart of the company;

poll the display device for a location of a mouse pointer;

highlight, on the display device, an element of the organizational chart underneath the location of the mouse pointer;

monitor the location of the mouse pointer and if the location of the mouse pointer remains over the element, display a meso view of the element at the location along with a name of an employee associated with the element;

prompt a user with prompts through the display device for periodic data on the employee;

accept the periodic data on the employee, where the periodic data comprises free-form text answers to the prompts;

tokenize the free-form text answers with a search of the free-form text answers for delimiters using natural language processing and store words between the delimiters in a word table data structure in the memory;

lemmatize the word table data structure with a stem extraction algorithm that places stems into a stem table data structure in the memory;

lookup each stem in a stem data structure in the memory for a Maslow-level stem score and a Flow Map stem score;

calculate an employee Maslow Hierarchy score and an employee Flow Map rating based on the Maslow-level stem score and the Flow Map stem score;

store the periodic data in a set of employee data records in an employee data structure in the memory, the set of employee data records comprising an employee identification, a date, the employee Maslow Hierarchy score, the employee Flow Map rating, and the periodic data for the employee;

aggregate the set of employee data records into a team Maslow Hierarchy score and a team Flow Map rating;

send the set of employee data records to a machine learning model tuned on feedback from actions suggested in previous weeks to form suggested actions; and display on the display device the representation of the organizational chart of the company, including the company Maslow Hierarchy score and the company Flow Map rating;

accept input from the user on the display device to display the employee Maslow Hierarchy score and the employee Flow Map rating;

accept input from the user on the display device to show details of the employee Maslow Hierarchy score and the employee Flow Map rating; and present the suggested actions on the display device for the employee to improve an employee score, where the employee score is one or more of the employee Maslow Hierarchy score and the employee Flow Map rating.

2. The computing device with the memory and the display device of claim 1 where the display device operates a web browser.

3. The computing device with the memory and the display device of claim 1 where the delimiters include spaces.

4. The computing device with the memory and the display device of claim 1 where the machine-readable non-transitory instructions to lemmatize the free-form text answers into the stem table data structure includes instructions to categorize the words into grammatical type.

5. The computing device with the memory and the display device of claim 1 where the machine-readable non-transitory instructions to calculate the employee Maslow Hierarchy score includes instructions to average employee Maslow Hierarchy scores.

6. The computing device with the memory and the display device of claim 1 where the machine-readable non-transitory instructions to calculate the employee Flow Map rating includes instructions to average employee Flow Map ratings.

7. The computing device with the memory and the display device of claim 1 where a determination of the employee score includes instructions to assign the employee score to a highest Maslow Hierarchy level with at least half of the free-form text answers being affirmative for a specific Maslow Hierarchy level.

8. The computing device with the memory and the display device of claim 1 where the machine learning model uses a neural network.

9. The computing device with the memory and the display device of claim 8 where the memory is divided across different countries and the machine learning model operates while maintaining separation of the memory from the different countries.

10. A method comprising:

displaying a macro view of a company on a display device, the macro view comprising a representation of an organizational chart of the company;

polling the display device for a location of a mouse pointer;

highlighting, on the display device, an element of the organizational chart underneath the location of the mouse pointer;

monitoring the location of the mouse pointer and if the location of the mouse pointer remains over the element, displaying a meso view of the element along with a name of an employee associated with the element;

prompting a user with prompts through the display device for periodic data on the employee;

accepting the periodic data on the employee, where the periodic data comprises free-form text answers to the prompts;

tokenizing the free-form text answers by searching the free-form text answers for delimiters using natural language processing and storing words between the delimiters in a word table data structure in a memory;

lemmatizing the word table data structure with a stem extraction algorithm and placing stems into a stem table data structure in the memory;

looking up each stem in a stem data structure in the memory for a Maslow-level stem score and a Flow Map stem score;

calculating an employee Maslow Hierarchy score and an employee Flow Map rating based on the Maslow-level stem score and the Flow Map stem score;

storing the periodic data in a set of employee data records in an employee data structure in the memory, the set of employee data records comprising an employee identification, a date, the employee Maslow Hierarchy score, the employee Flow Map rating, and the periodic data for the employee;

aggregating the set of employee data records into a team Maslow Hierarchy score and a team Flow Map rating;

aggregating the set of employee data records into a company Maslow Hierarchy score and a company Flow Map rating;

sending the set of employee data records to a machine learning model tuned on feedback from actions suggested in previous weeks to form suggested actions; and displaying on the display device the representation of the organizational chart of the company, including the company Maslow Hierarchy score and the company Flow Map rating;

accepting input from the user on the display device to display the employee Maslow Hierarchy score and the employee Flow Map rating;

accepting input from the user on the display device to show details of the employee Maslow Hierarchy score and the employee Flow Map rating; and presenting the suggested actions on the display device for the employee to improve an employee score, where the employee score is one or more of the employee Maslow Hierarchy score and the employee Flow Map rating.

11. The method of claim 10 where the display device operates a web browser.

12. The method of claim 10 where the delimiters include spaces.

13. The method of claim 10 where the lemmatizing of the free-form text answers into the stem table includes instructions to categorize the words into grammatical type.

14. The method of claim 10 where the calculating of the employee Maslow Hierarchy score includes averaging the employee Maslow Hierarchy score.

15. The method of claim 10 where the calculating of the employee Flow Map rating includes averaging the employee Flow Map rating.

16. The method of claim 10 where a determination of the employee score includes assigning the employee score to a highest Flow Map level with at least half of the free-form text answers being affirmative for a specific Flow Map level.

17. The method of claim 10 where the machine learning model uses K-means.

18. The method of claim 17 where the memory is divided across different countries and the machine learning model operates while maintaining separation of the memory from the different countries.

19. A system comprising:

a processing unit;

a display device communicatively coupled to the processing unit;

a disk electrically connected to the processing unit, the disk including:

a stem data structure including stems, Maslow-level stem scores, and a Flow Map stem scores;

an answer data structure including free-form text answers to prompts, a word table data structure, and a stem table data structure;

an employee data structure including an employee identification, a date, an employee Maslow Hierarchy score, an employee Flow Map rating, and periodic data for an employee, for each employee;

a team data structure including a team Maslow Hierarchy score and a team Flow Map rating for each team; and a company data structure including a company Maslow Hierarchy score and a company Flow Map rating;

a memory electrically connected to the processing unit, the memory including:

a data input module configured to prompt a user with the prompts through the display device for the periodic data on a plurality of employees related to a company, accept the periodic data on the plurality of employees, and populate the answer data structure;

a data analysis module configured to tokenize the free-form text answers in the answer data structure with a search of the free-form text answers for delimiters using natural language processing and store words between the delimiters to populate the word table data structure, lemmatize the word table data structure with a stem extraction algorithm that places stems into the stem table data structure, lookup each stem in the stem data structure for the Maslow-level stem scores and the Flow Map stem scores for each stem, calculate the employee Maslow Hierarchy score and the employee Flow Map rating based on the Maslow-level stem scores and the Flow Map stem scores, and store the periodic data in the employee data structure;

a data aggregation module configured to aggregate the employee data structure into the team Maslow Hierarchy score and the team Flow Map rating, and aggregate the employee data structure into the company Maslow Hierarchy score and the company Flow Map rating;

an employee action module configured to send the employee data structure to a machine learning model tuned on feedback from actions suggested in previous weeks to form suggested actions; and a data display module configured to display on the display device a macro view of the company on the display device, the macro view comprising a representation of an organizational chart of the company, poll the display device for a location of a mouse pointer, highlight, on the display device, an element of the organizational chart underneath the location of the mouse pointer, monitor the location of the mouse pointer and if the location of the mouse pointer remains over the element, display a meso view of the element at the location along with a name of the employee associated with the element, where the representation of the organizational chart of the company includes the company Maslow Hierarchy score and the company Flow Map rating, accept input from the user on the display device to display the employee Maslow Hierarchy score and the employee Flow Map rating, accept input from the user on the display device to show details of the employee Maslow Hierarchy score and the employee Flow Map rating, and display the suggested actions on the display device for the employee to improve an employee score, where the employee score is one or more of the employee Maslow Hierarchy score and the employee Flow Map rating.

20. The system of claim 19, wherein the machine learning model uses random forest.

* * * * *